United States Patent [19]
Watanabe et al.

[11] Patent Number: 4,763,167
[45] Date of Patent: Aug. 9, 1988

[54] IMAGE FORMING APPARATUS

[75] Inventors: Tsutomu Watanabe; Nobuhiro Kasama, both of Yokohama; Masafumi Wataya, Tokyo; Takaaki Ashinuma; Yoshihiko Hirose, both of Yokohama; Yasuo Suzuki, Tokyo, all of Japan

[73] Assignee: Canon Kabushiki Kaisha, Tokyo, Japan

[21] Appl. No.: 24,372

[22] Filed: Mar. 13, 1987

[30] Foreign Application Priority Data

Mar. 13, 1986 [JP] Japan ................................. 61-55275
Mar. 13, 1986 [JP] Japan ................................. 61-55276
Mar. 13, 1986 [JP] Japan ................................. 61-55267
Mar. 13, 1986 [JP] Japan ................................. 61-55272

[51] Int. Cl.$^4$ .......................................... G03G 15/00
[52] U.S. Cl. ............................... 355/14 R; 355/3 R; 355/3 SH; 355/14 SH

[58] Field of Search .................. 355/3 R, 14 R, 3 SH, 355/14 SH, 72

[56] References Cited

U.S. PATENT DOCUMENTS

| 4,444,491 | 4/1984 | Rinehart et al. | 355/14 SH X |
| 4,561,772 | 12/1985 | Smith | 355/14 SH |
| 4,582,421 | 4/1986 | Hamlin et al. | 355/72 |
| 4,592,651 | 6/1986 | Oikawa et al. | 355/14 SH X |
| 4,640,611 | 2/1987 | Ohdake et al. | 355/145 H X |

Primary Examiner—A. C. Prescott
Attorney, Agent, or Firm—Fitzpatrick, Cella, Harper & Scinto

[57] ABSTRACT

An image forming apparatus with stapling or punching capability, in which the direction of image formed on a sheet is controlled according to the position of stapling or punching, in order to achieve efficient stapling or punching with a stapling or punching device.

7 Claims, 46 Drawing Sheets

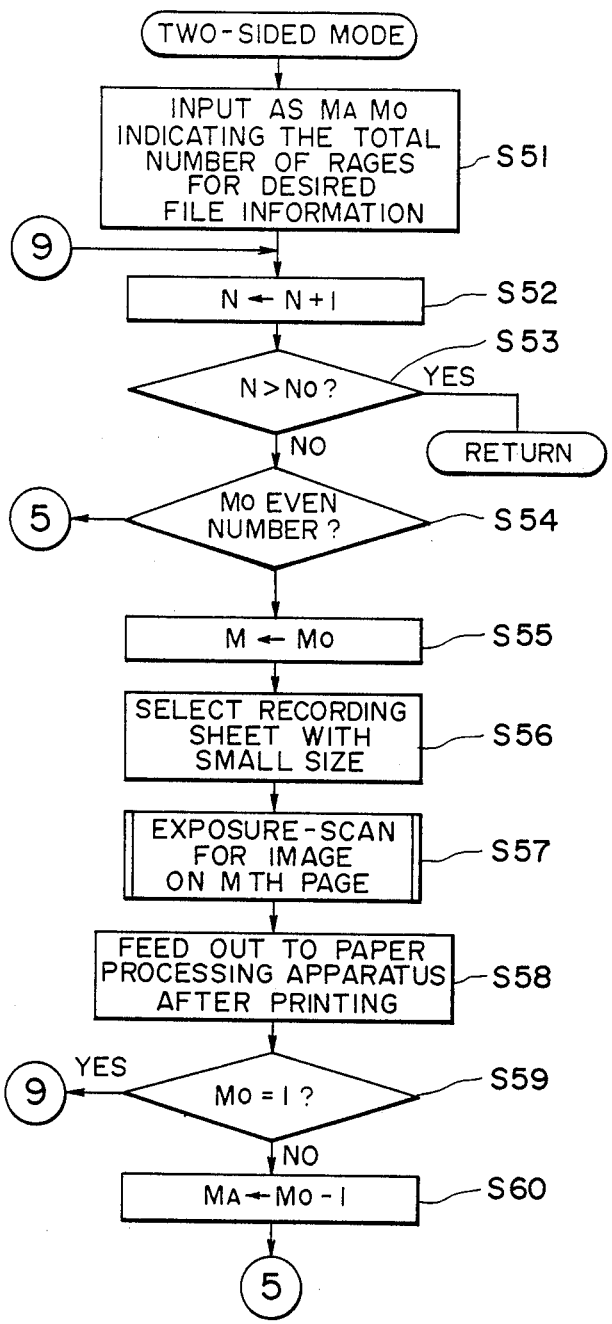
FIG. 12D-a

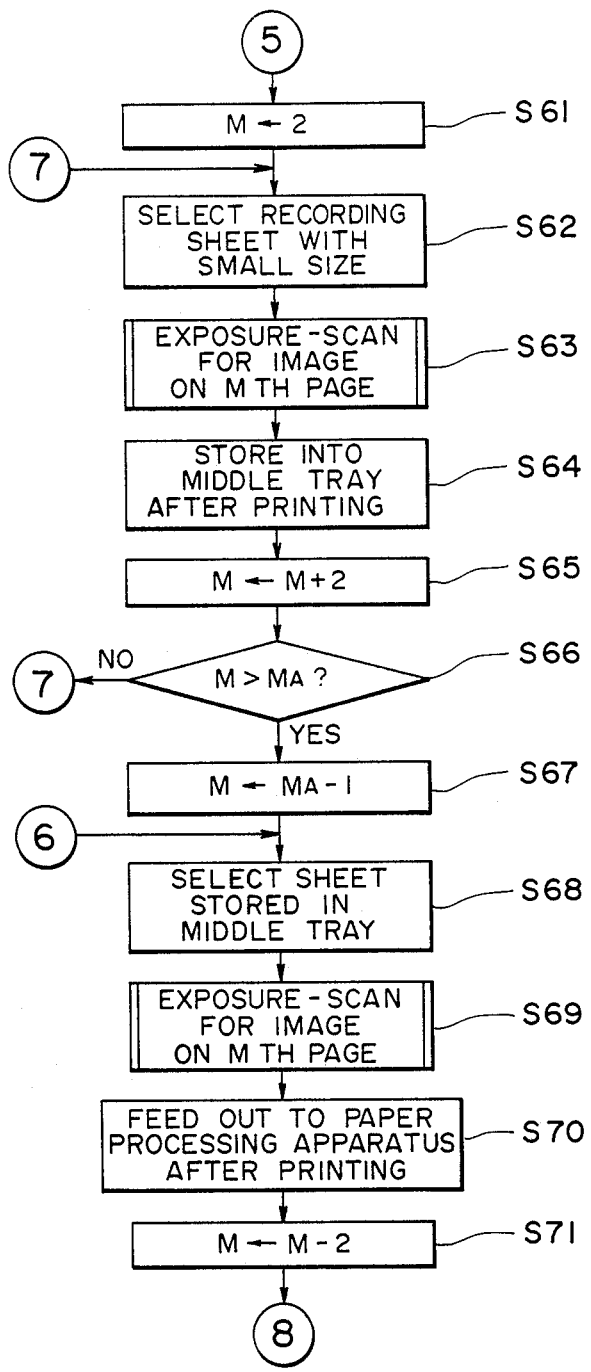
FIG. 12D-b

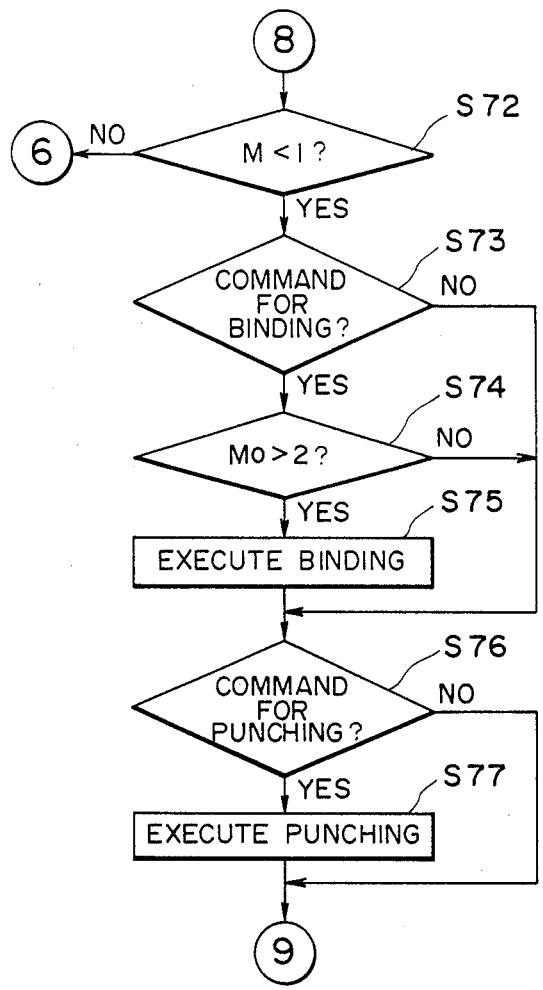
FIG. 12D-c
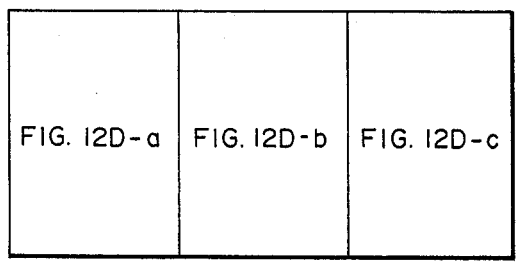
FIG. 12D

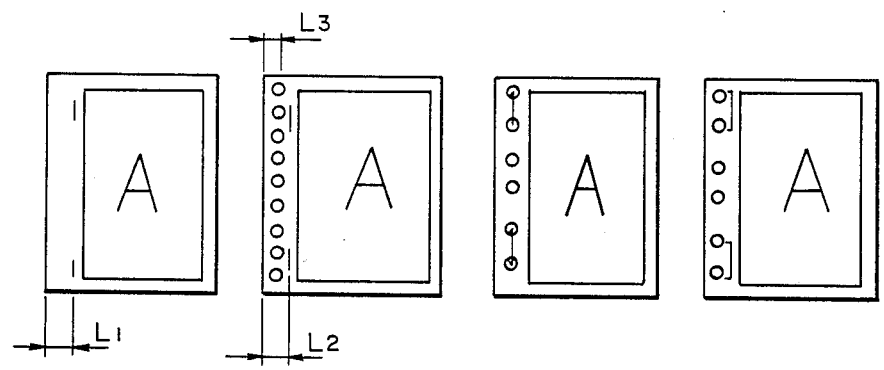
FIG. 13A  FIG. 13C
FIG. 13B  FIG. 13D
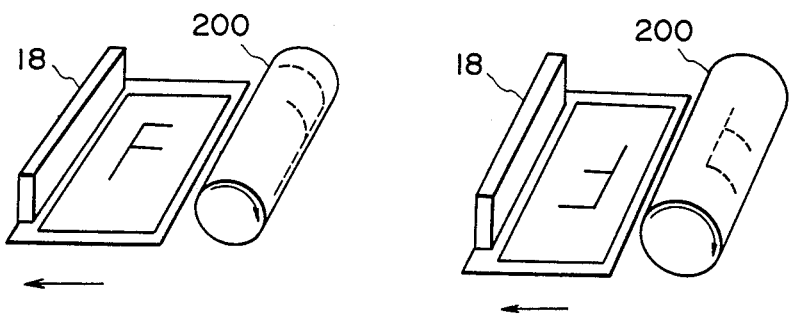
FIG. 14A  FIG. 14B
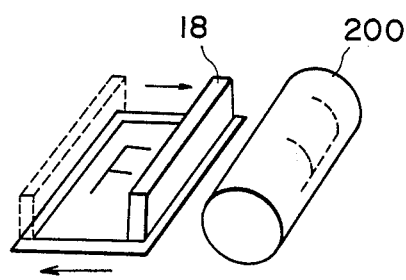
FIG. 14C

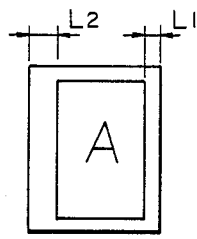 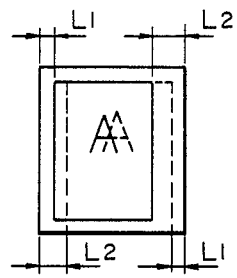
FIG. 15A  FIG. 15B
FIG. 16A  FIG. 16B
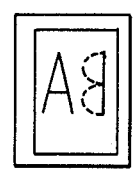 →  + 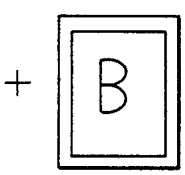
FIG. 16C  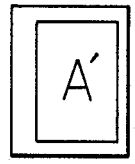 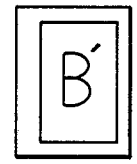
FIG. 16D   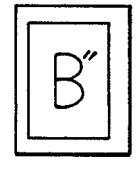

FIG. 17C
FIG. 17D
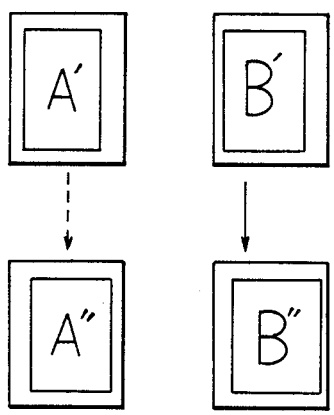
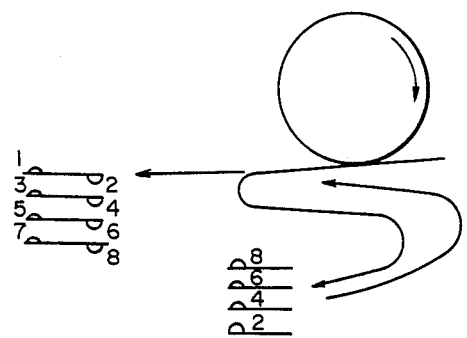
FIG. 18

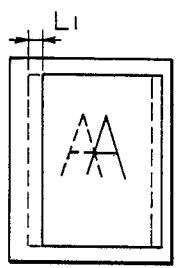 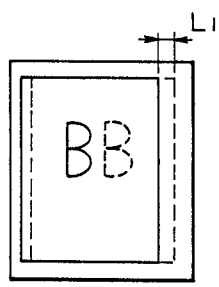
FIG. 19A   FIG. 19B
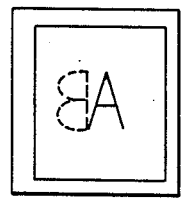
FIG. 19C
FIG. 20A   FIG. 20C
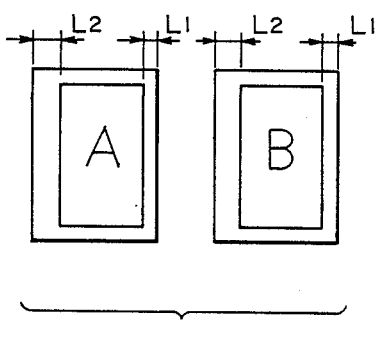   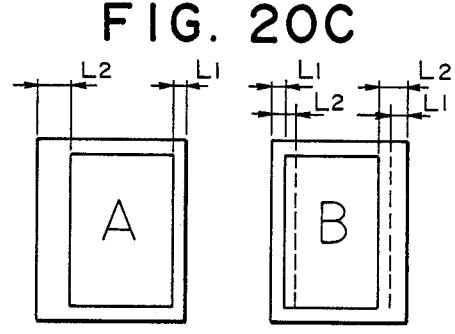
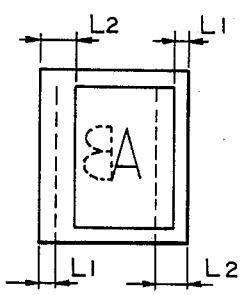      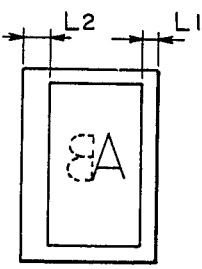
FIG. 20B   FIG. 20D FIG. 21A  FIG. 21B
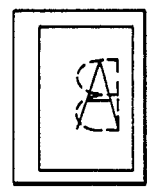  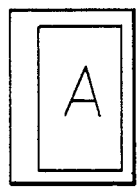  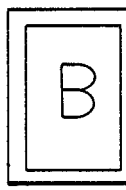
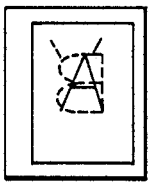  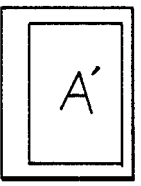  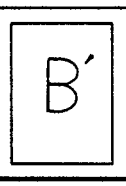
FIG. 21C  FIG. 21D
FIG. 22B
FIG. 22A
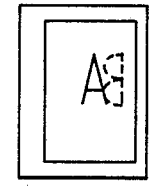  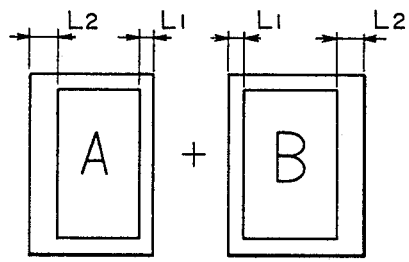
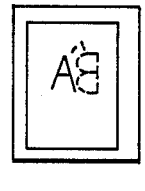  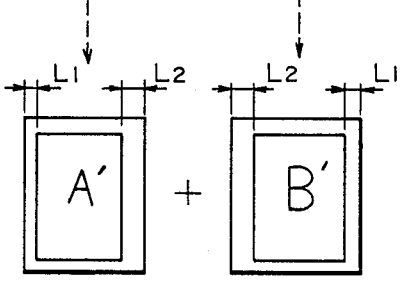
FIG. 22C  FIG. 22D

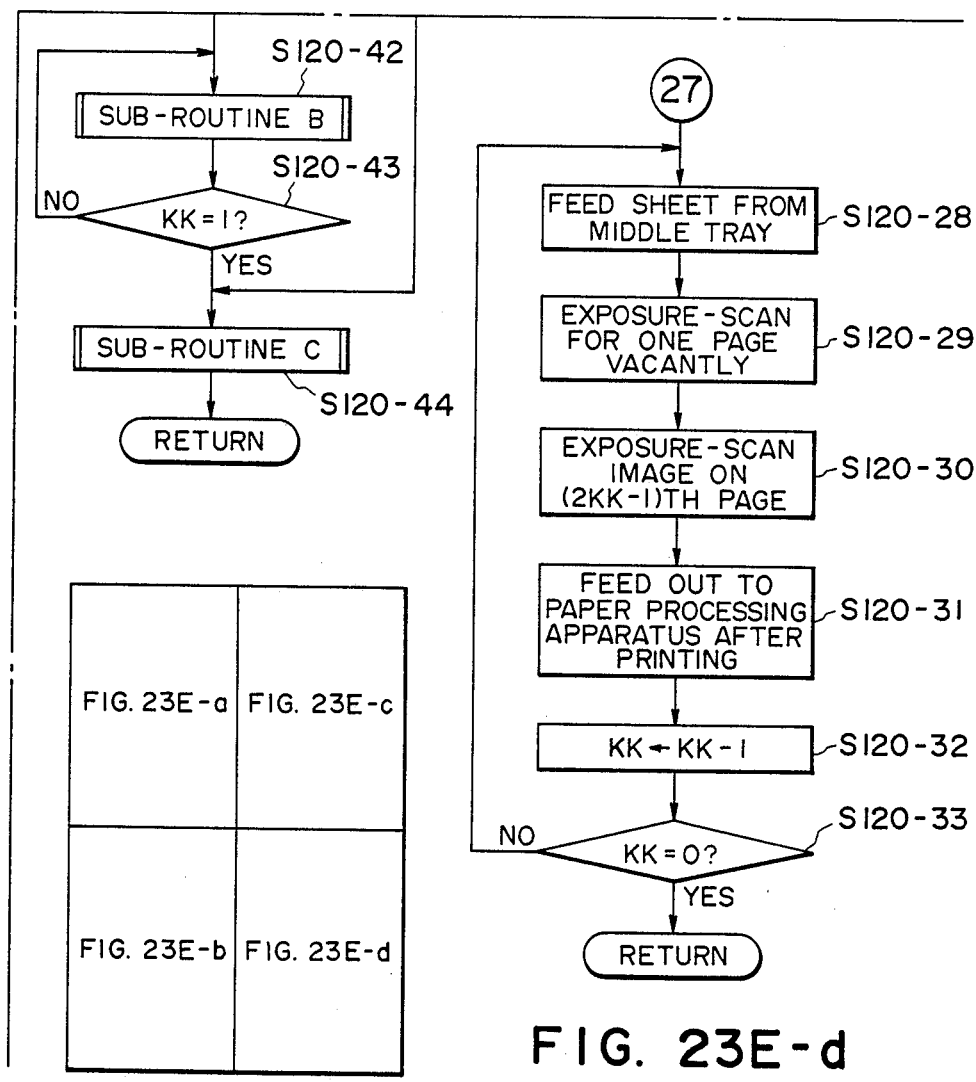

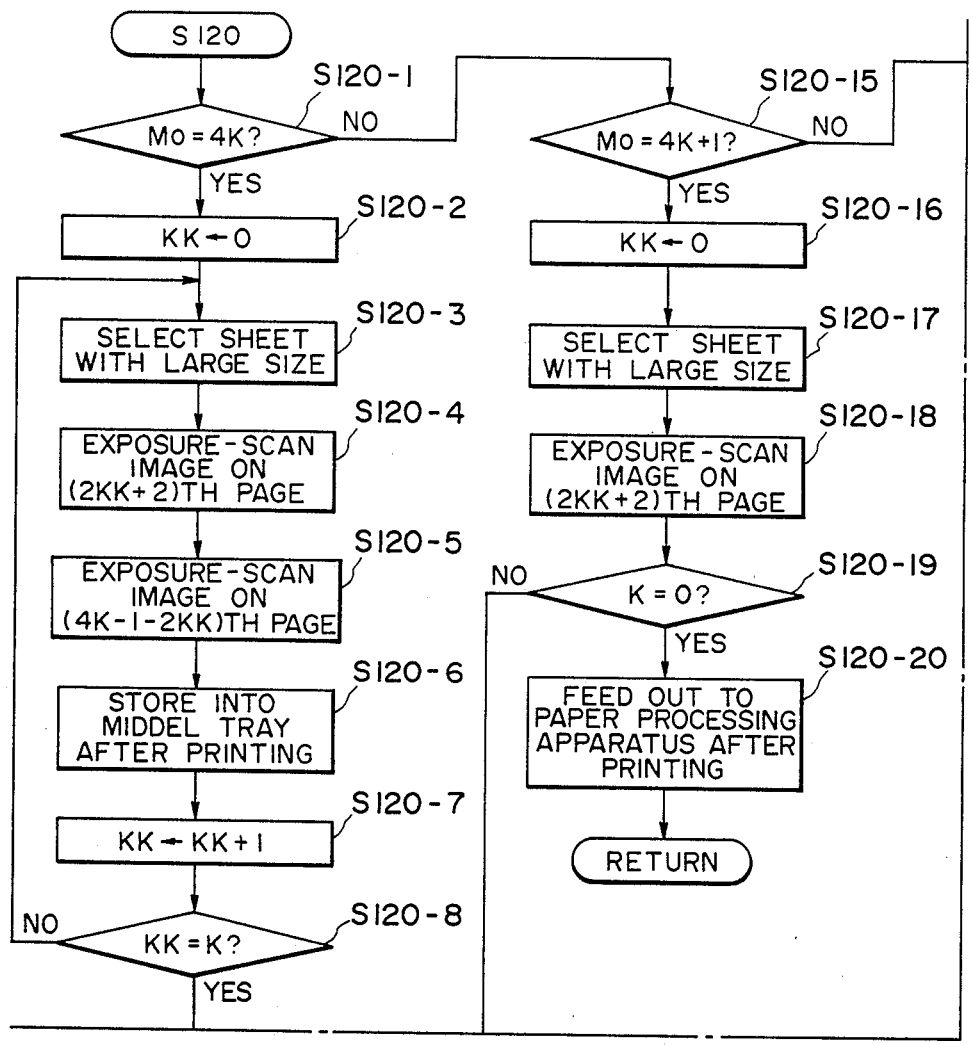
FIG. 23E-a

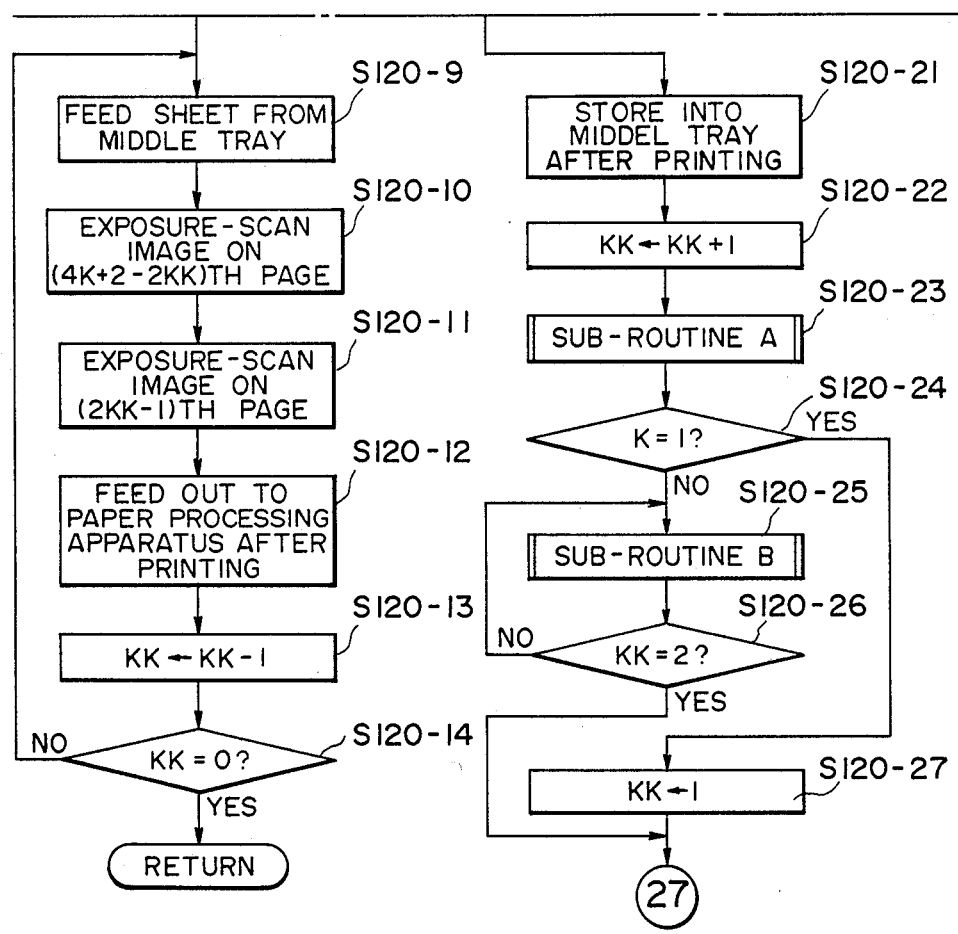
FIG. 23E-b

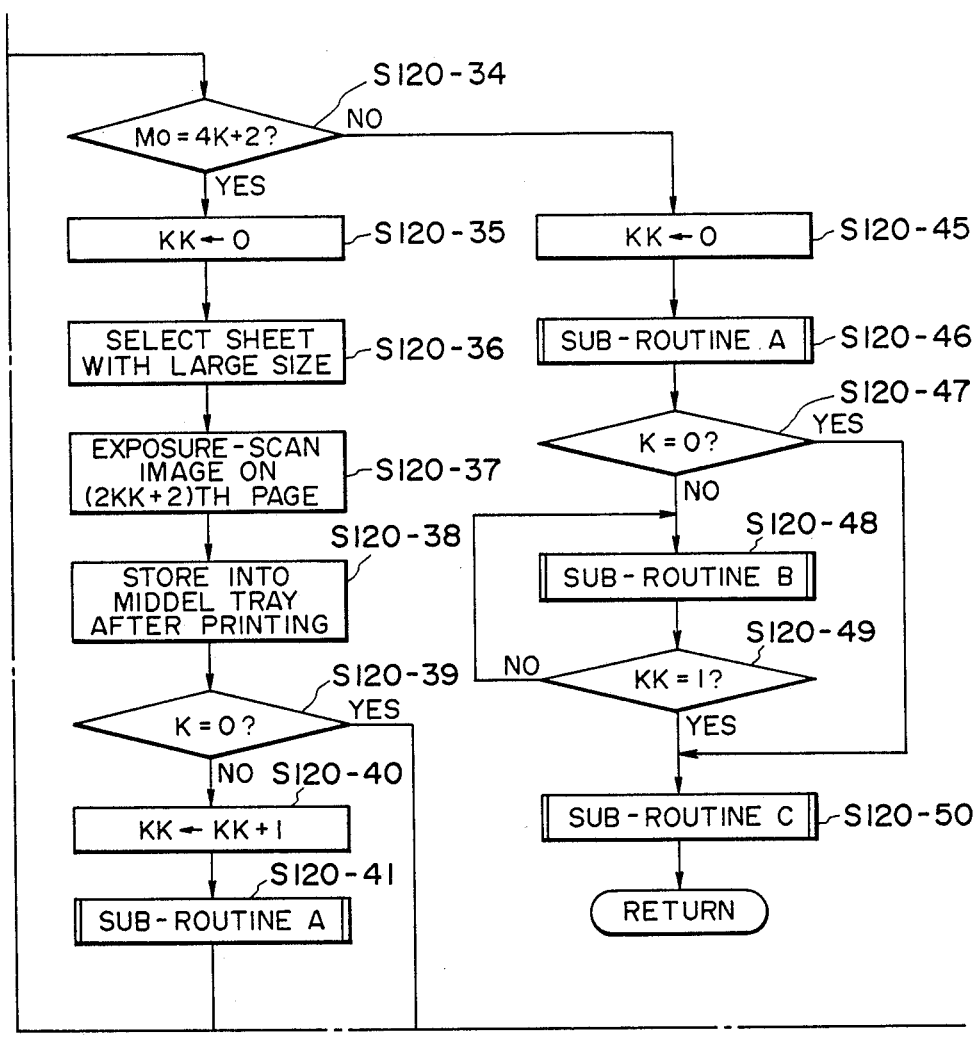
FIG. 23E-c

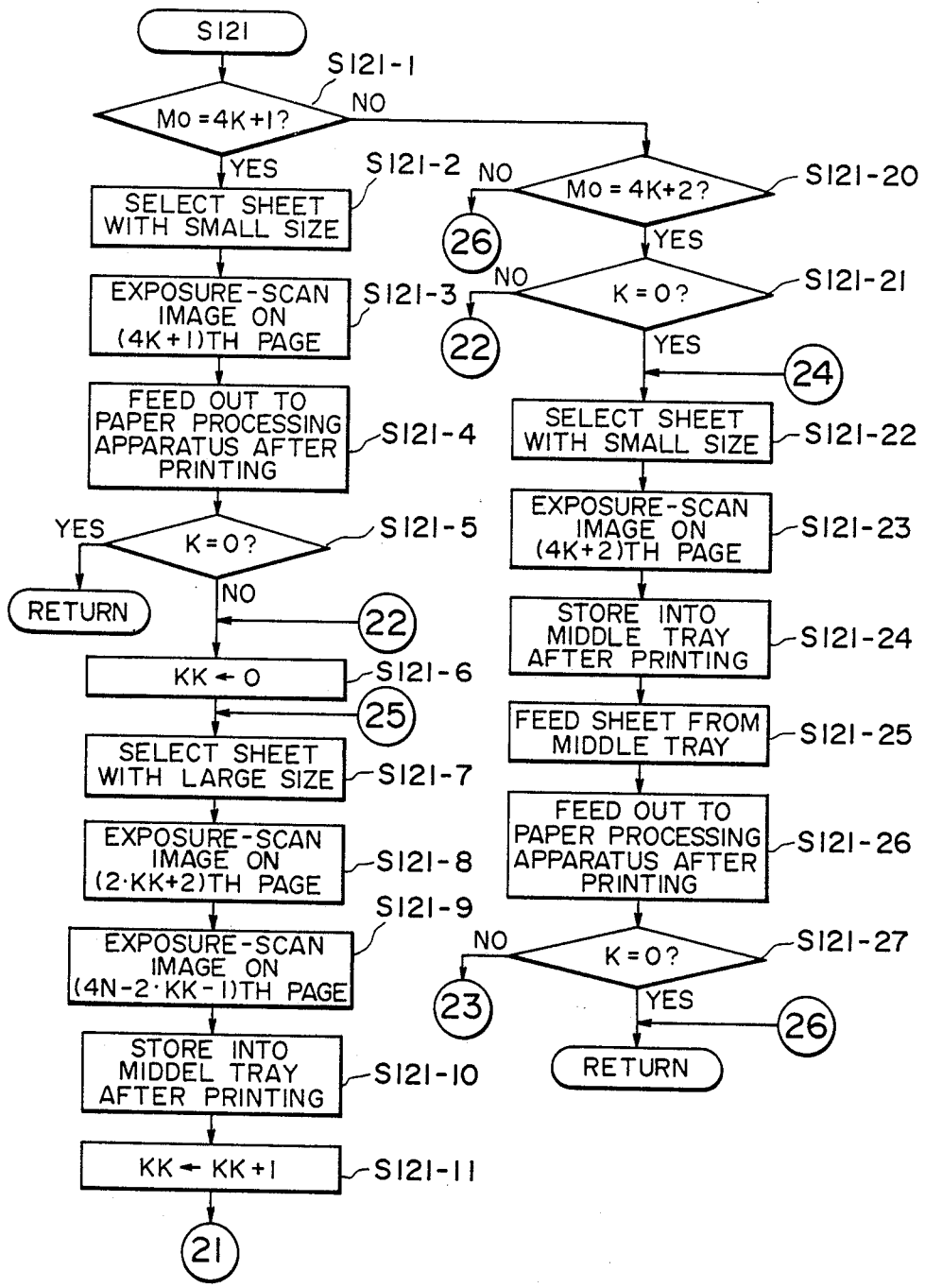
FIG. 23F-a

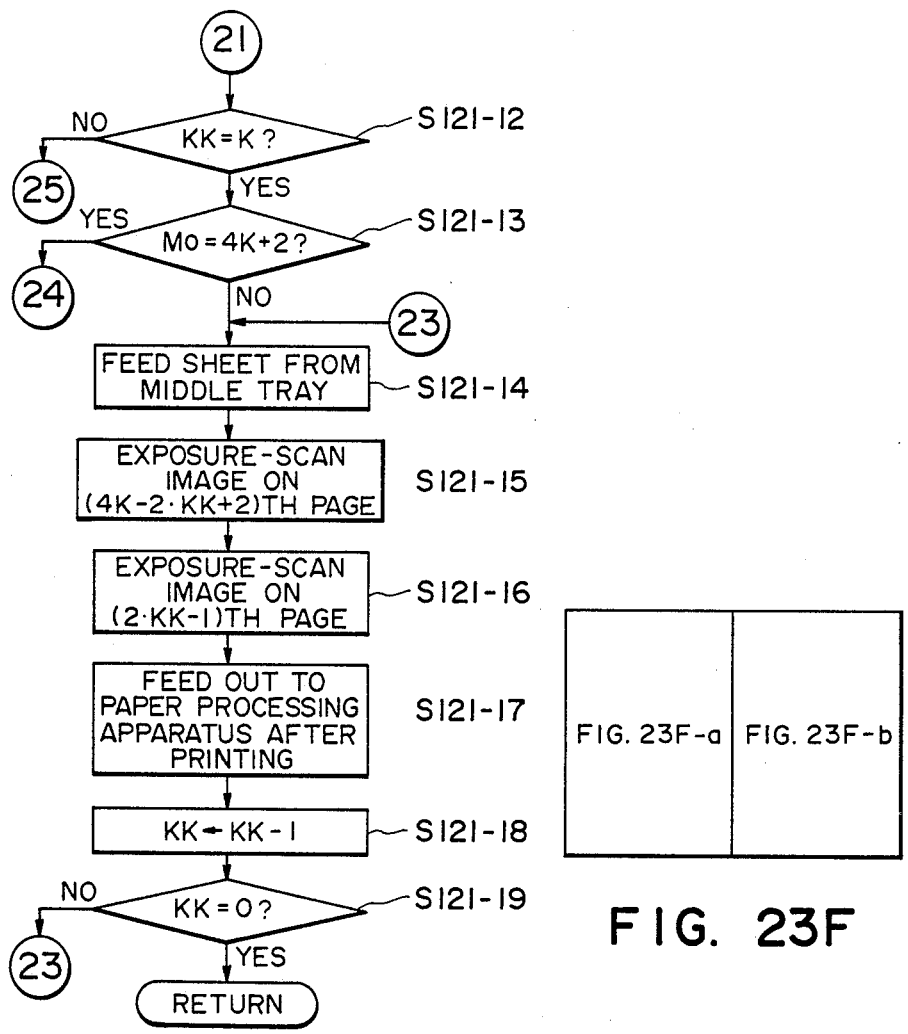
FIG. 23F-b

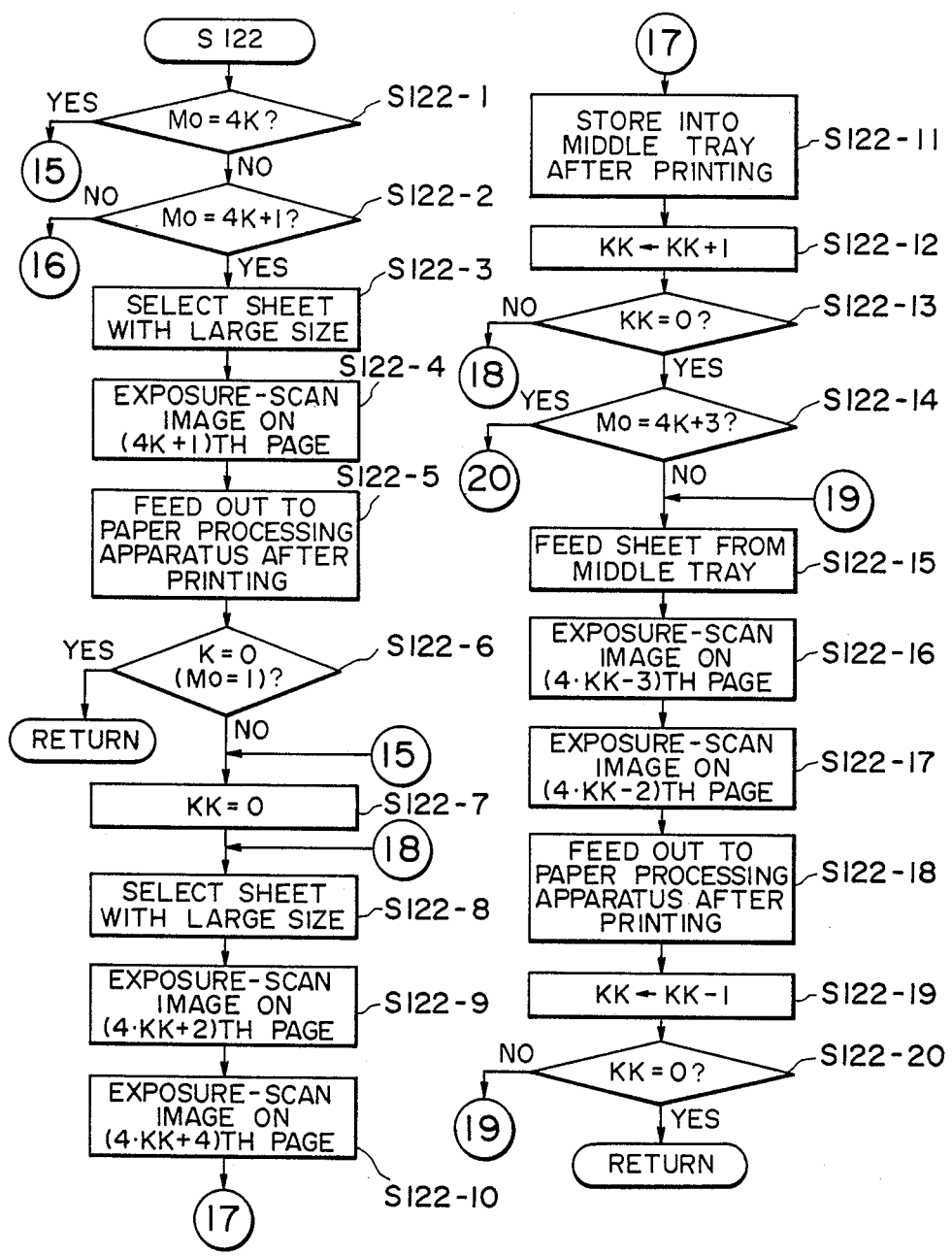
FIG. 23G-a

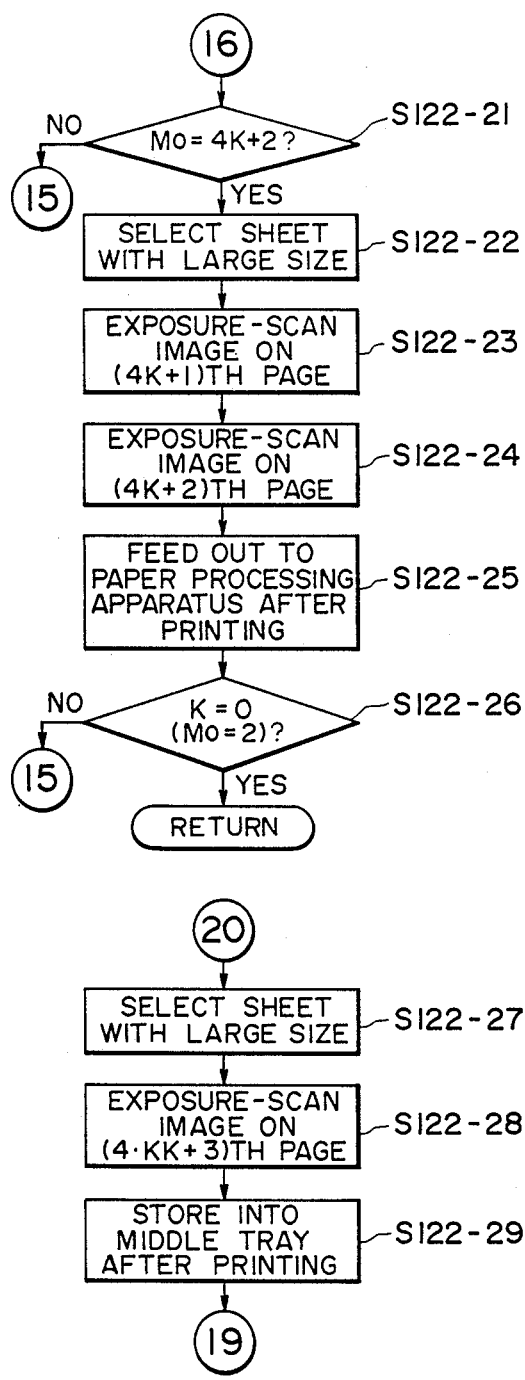
FIG. 23G-b
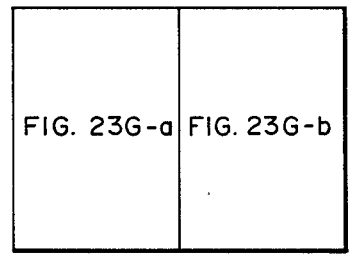
FIG. 23G

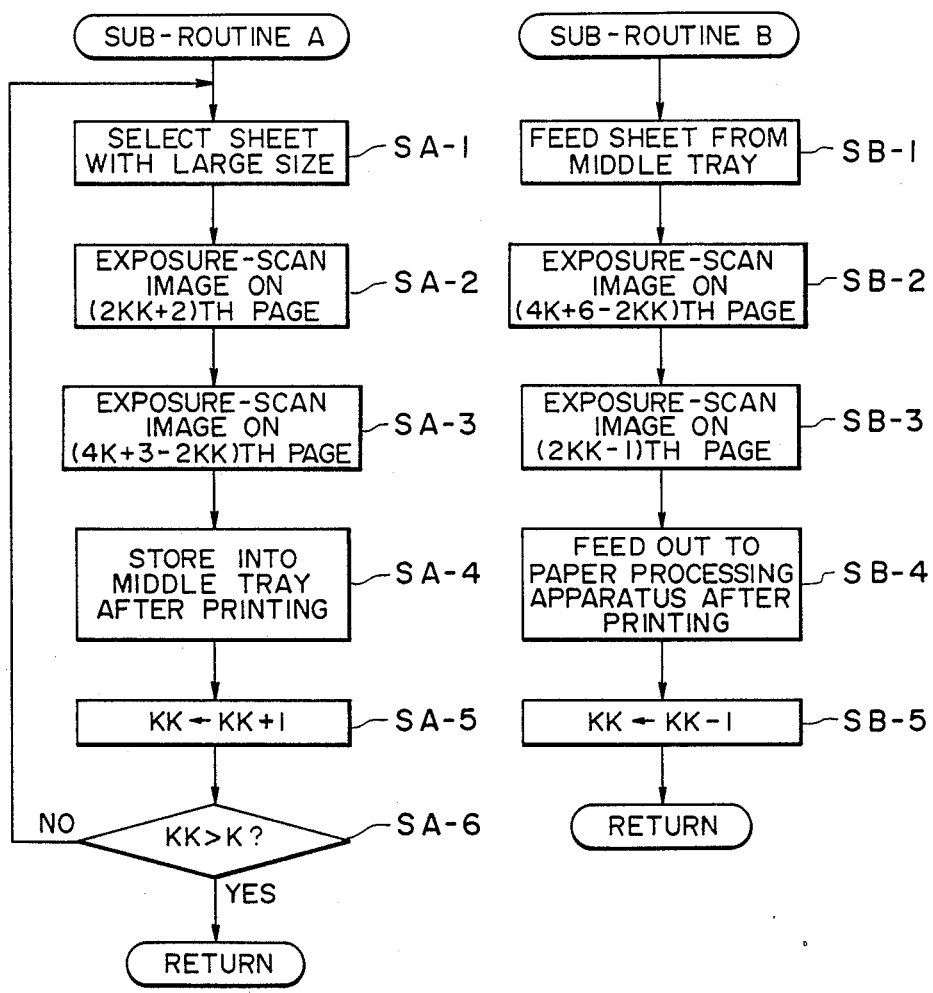
FIG. 231-a

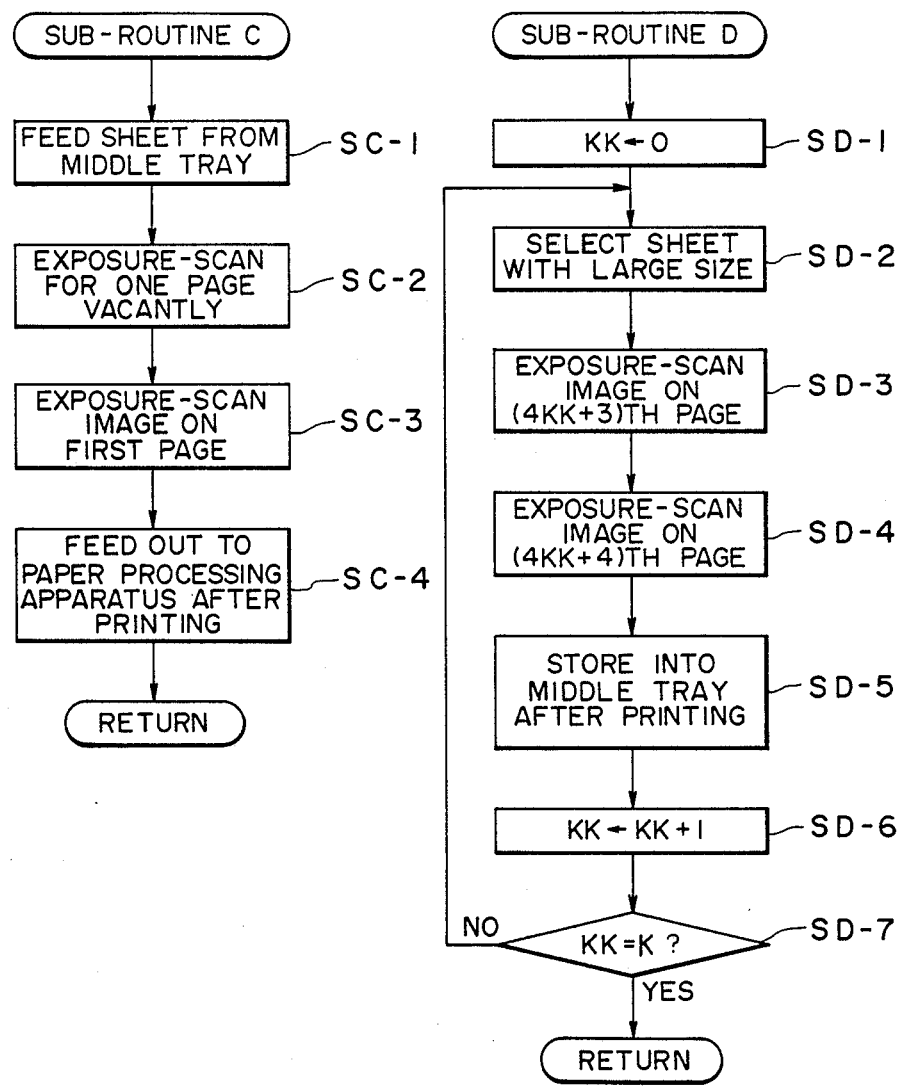
FIG. 231-b

FIG. 231-c

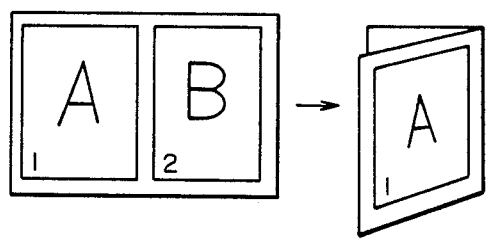
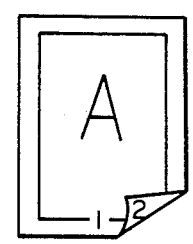
FIG. 24A          FIG. 24B
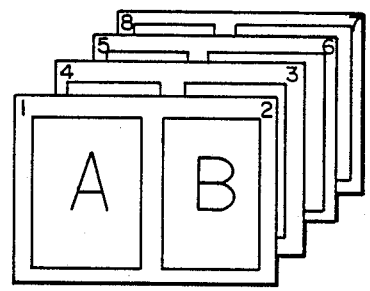
FIG. 25
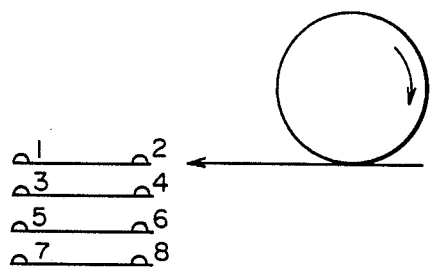
FIG. 26

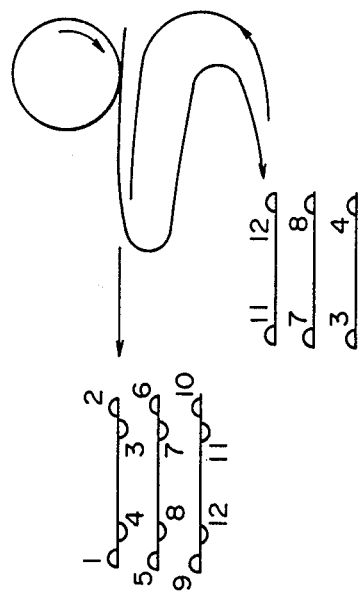
FIG. 27A
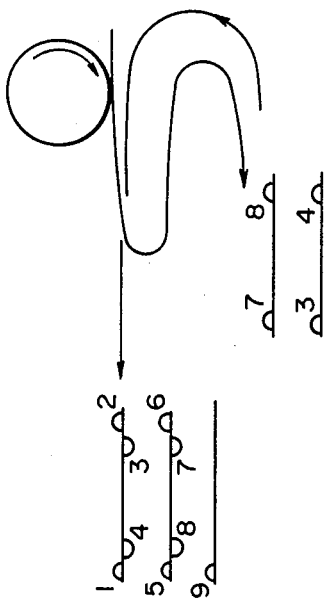
FIG. 27B
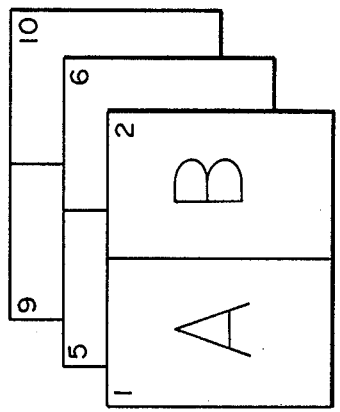
$M_0 = 4K$
$(K = 1, 2, \ldots)$
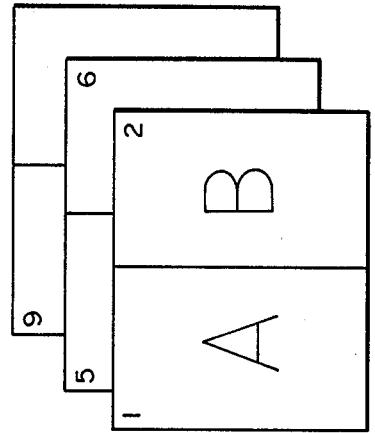
$M_0 = 4K + 1$
$(K = 0, 1, \ldots)$

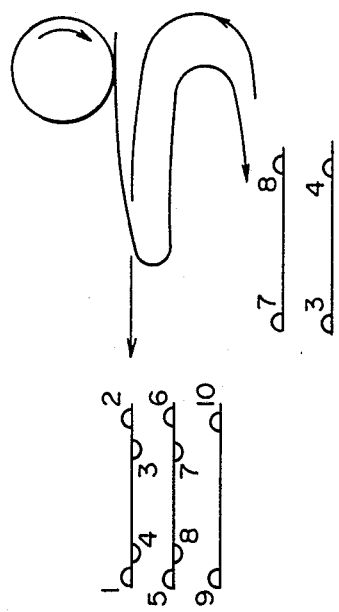
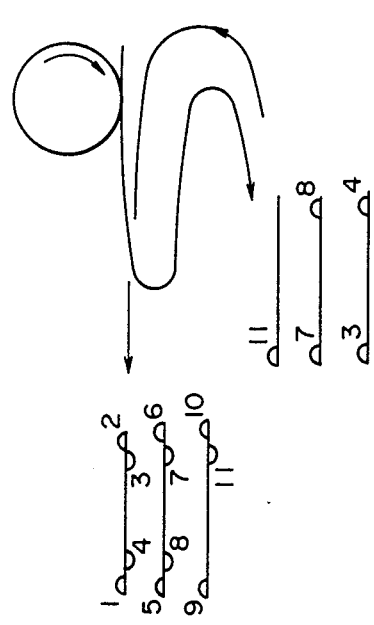
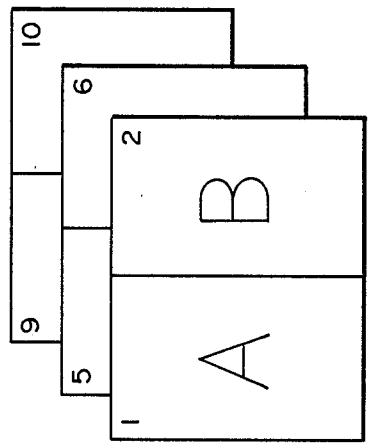
FIG. 27C
$Mo = 4K + 2$
$(K = 0, 1, \ldots)$
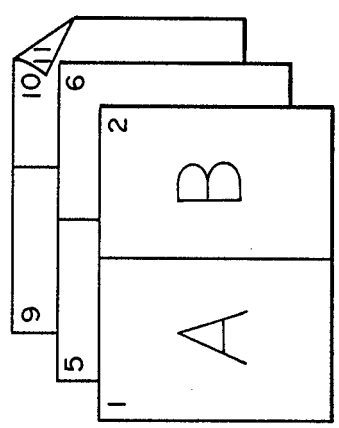
FIG. 27D
$Mo = 4K + 3$
$(K = 0, 1, \ldots)$

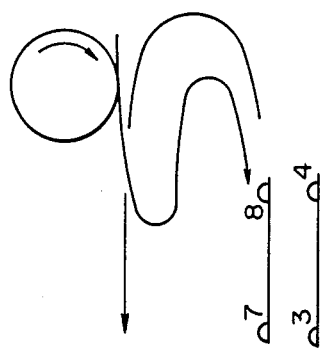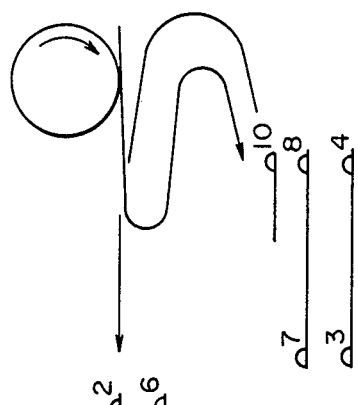
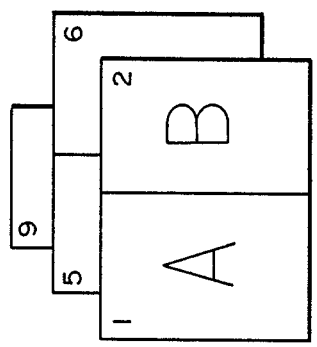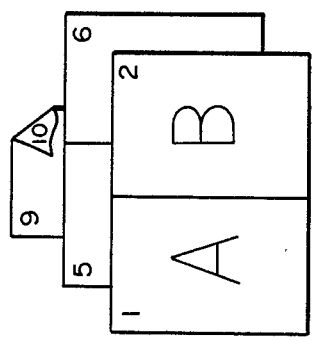
FIG. 28A
FIG. 28B
$M_O = 4K+1$
$(K=0,1,\ldots)$
$M_O = 4K+2$
$(K=0,1,\ldots)$

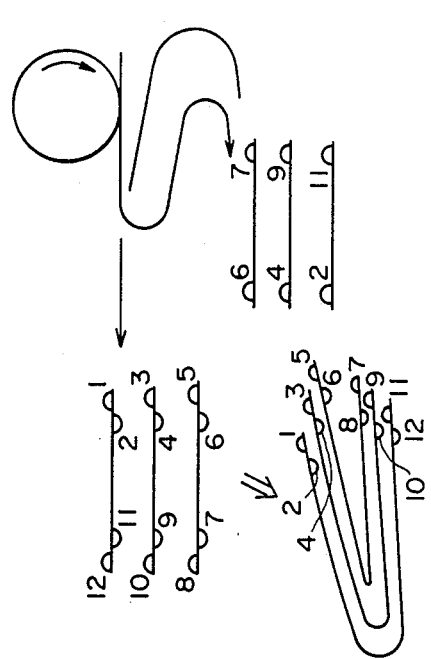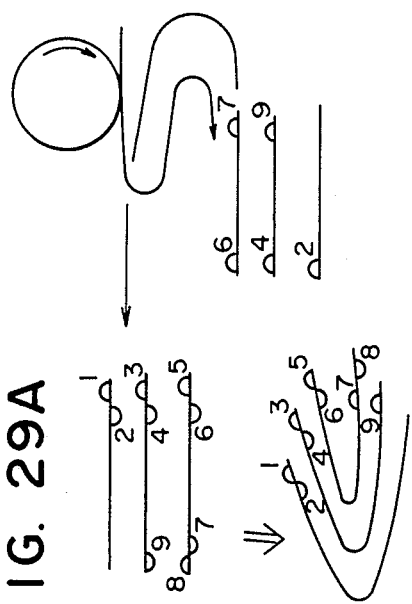
FIG. 29A
FIG. 29B
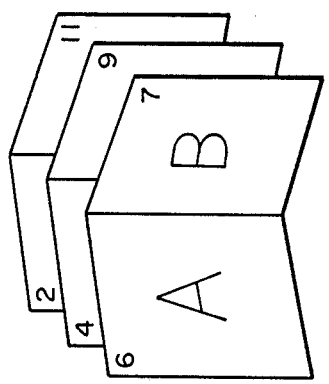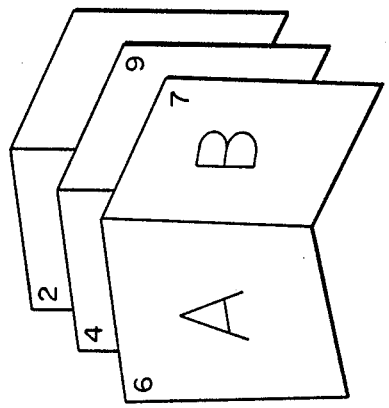
$Mo = 4K$
$(K = 1, 2, \ldots)$
$Mo = 4K + 1$
$(K = 0, 1, \ldots)$

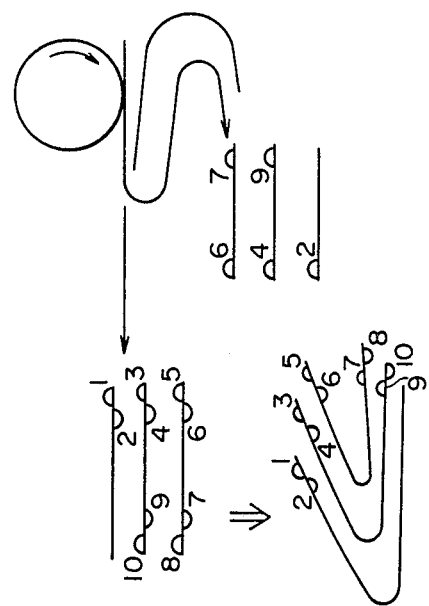
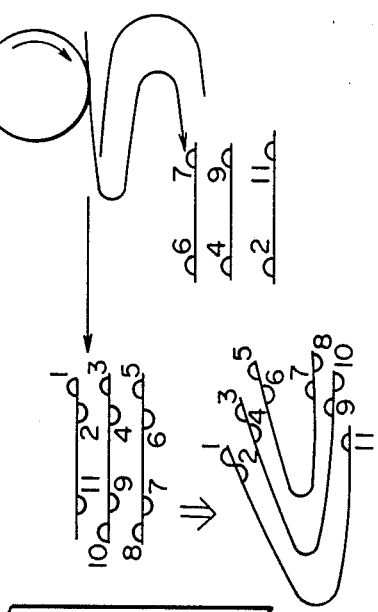
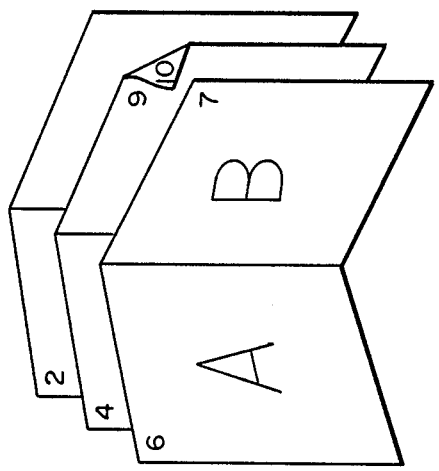
FIG. 29C
$M_0 = 4K + 2$
$(K = 0, 1, .....)$
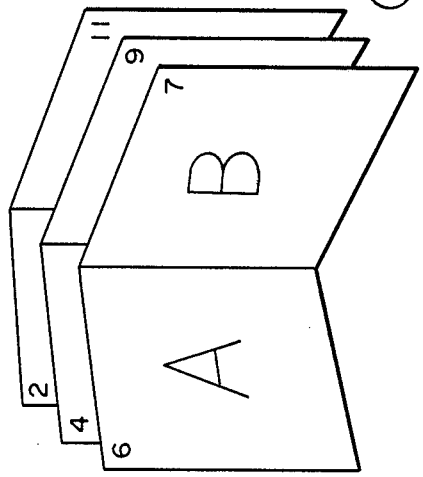
FIG. 29D
$M_0 = 4K + 3$
$(K = 0, 1, .....)$

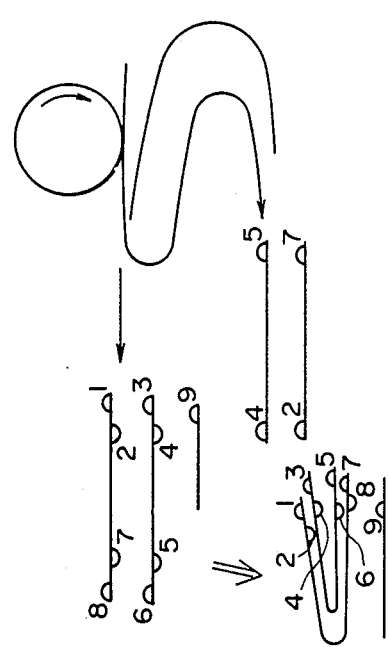
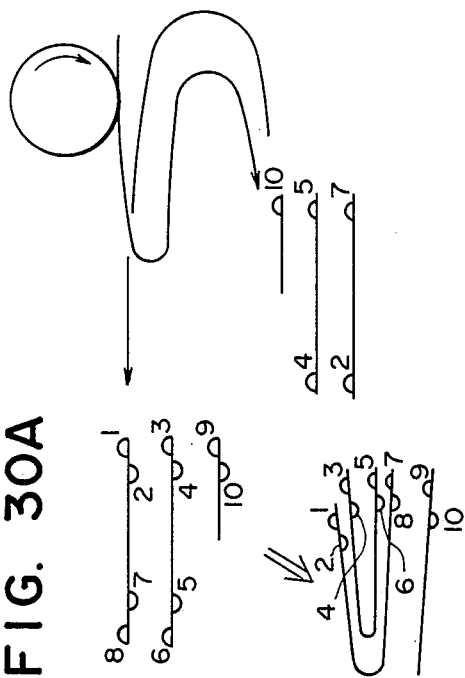
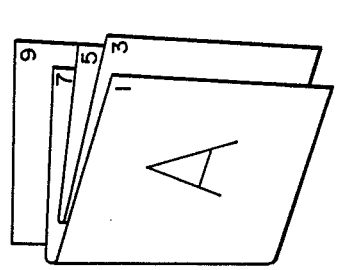
$M_0 = 4K+1$
$(K=0,1,\ldots)$
FIG. 30A
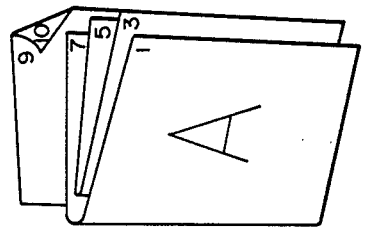
$M_0 = 4K+2$
$(K=0,1,\ldots)$
FIG. 30B

IMAGE FORMING APPARATUS

BACKGROUND OF THE INVENTION

1. Field of the Invention

The present invention relates to an apparatus for forming an image.

2. Related Background Art

There is recently proposed an apparatus in which a large amount of image information is stored in an image file such as optical disks, and information can be read from a desired file and printed. When such apparatus is connected to a stapling or punching unit for stapling or punching the recording sheets, such stapling or punching can only be made on a predetermined side of the sheet if there is provided only one stapling or punching device. On the other hand, the use of two stapling or punching devices increases the cost.

Also in case of forming two small-sized images respectively on the left-hand half and right-hand half of a large sheet, the order of pages may become inappropriate according to the direction of sheet stapling.

Also in case of stapling plural sheets, the first page, at the top, is easily broken if the ends of the staple is on the first page. However the use of plural stapling devices in different directions will require an increased cost.

Also the operator often does not know the number of pages in a desired file. Thus, in case of stapling the sheets with a connected stapling unit, the staples will be wasted if a file is composed of a page.

Also in case of stapling or punching the sheets with a connected stapling or punching unit, the position of stapling or punching is inevitably fixed. Thus the binding form of images is limited and may become inconvenient for the book binding operation.

Also in case of stapling or punching the sheets with connected stapling and punching units, if both operations are designated, the punching position may coincide with the stapling position to hinder the stapling operation.

Also a printing instruction without a margin for stapling or punching may hinder the stapling or punching operation.

Also in case of stapling or folding the sheets with a connected stapling or folding unit, the recording sheets exceeding the capacity of such unit have to be processed in plural bundles, and the division into such bundles may result in a disorder of pages.

Also in case of forming for example two A4-sized images on a face of an A3-sized sheet, the obtained sheets will become bulky if they are simply bound, and the rear face of sheets will be wasted if such sheets are bound after folding into half.

Also in case of forming two images on a face of a large sheet such as A3- or A4-sized sheet, there will result blank portions according to the number of pages, thus wasting sheets or causing inconvenience in sheet binding.

SUMMARY OF THE INVENTION

An object of the present invention is to prevent the above-mentioned drawbacks.

Another object of the present invention is to provide an improvement on an image forming apparatus.

Still another object of the present invention is to provide an image forming apparatus capable of processing recording sheets at a desired position thereby facilitating the binding operation.

Still another object of the present invention is to provide an image forming apparatus capable of reducing damage to recording materials in case of binding the same.

Still another object of the present invention is to provide an image forming apparatus capable of prohibiting the change in direction of image during a series of image forming operations, thereby avoiding unnecessary image formation.

Still another object of the present invention is to provide an image forming apparatus capable of maintaining the formed images in a correct order of pages.

Still another object of the present invention is to provide an image forming apparatus capable of avoiding unnecessary sheet stapling operation.

Still another object of the present invention is to provide an image forming apparatus capable of stapling images in various forms.

Still another object of the present invention is to provide a sheet post-processing apparatus capable of applying various post-processes to image recording sheets.

Still another object of the present invention is to provide an image forming apparatus capable of forming records accepting stapling or punching even when a margin is designated therefor.

Still another object of the present invention is to provide an image forming apparatus capable of effecting a post-process to sheets with a correct order of pages even when a large number of pages is involved.

Still another object of the present invention is to provide an image forming apparatus capable of preventing waste in sheets.

Still another object of the present invention is to provide an image forming apparatus capable of selecting one of plural recording formats according to the total number of pages of a set of images.

The foregoing and still other objects of the present invention, and the features and advantages thereof, will become fully apparent from the following description, to be taken in conjunction with the attached drawings, and the appended claims.

BRIEF DESCRIPTION OF THE DRAWINGS

FIG. 11A and 11B are views showing the order of pages when two images are recorded on each side of a sheet, wherein FIG. 11A shows a case of stapling at left end while FIG. 11B shows a case of stapling at center;

FIGS. 12A to 12E are flow charts showing the operation in a small size recording mode;

FIGS. 13A to 13D are views of sheets subjected to stapling and/or punching;

FIGS. 14A to 14C are views showing the relation among a sheet, an image formed on a drum and a stapling unit;

FIGS. 15A and 15B are views showing the stapling margin on a sheet to be stapled at left and at right;

FIGS. 16A to 16D are views showing the relation between an original bound at left side and the stapling margin of a recorded image;

FIGS. 17A to 17D are views showing the relation between an original bound at right side and the stapling margin of a recorded image;

FIG. 18 is a view showing the order or pages in two-side recording on small-sized sheets;

FIGS. 19A to 19C are views showing the relation between a one-side original without stapling margin and the stapling margin of a recorded image;

FIGS. 20A to 20D are views showing the relation between a one-side original with a stapling margin and the stapling of recorded image;

FIGS. 21A to 21D are views showing the relation between a two-side original and a recorded image having a margin position;

FIGS. 22A to 22D are views showing the relation between a two-side original and a recorded image have different stapling margin positions;

FIGS. 23A to 23I are flow charts showing the function in a large size recording mode;

FIG. 24A is a view of a large size sheet wherein two images are recorded on a side thereof;

FIG. 24B is a view of a small size sheet wherein an image is recorded on each side thereof;

FIGS. 25 and 26 are views showing the order of pages in case two images are recorded on a side of each of large size sheets;

FIGS. 27A to 27D are views showing the order of pages of recorded images in a single size mode in a first mode;

FIGS. 28A and 28B are views showing the order of pages of the recorded images in a mixed size mode in a first mode;

FIGS. 29A to 29D are views showing the order of pages in a single size mode in a second mode;

FIGS. 30A and 30B are views showing the order of pages in a mixed size mode in a second mode;

DETAILED DESCRIPTION OF THE PREFERRED EMBODIMENTS

Figure 1:
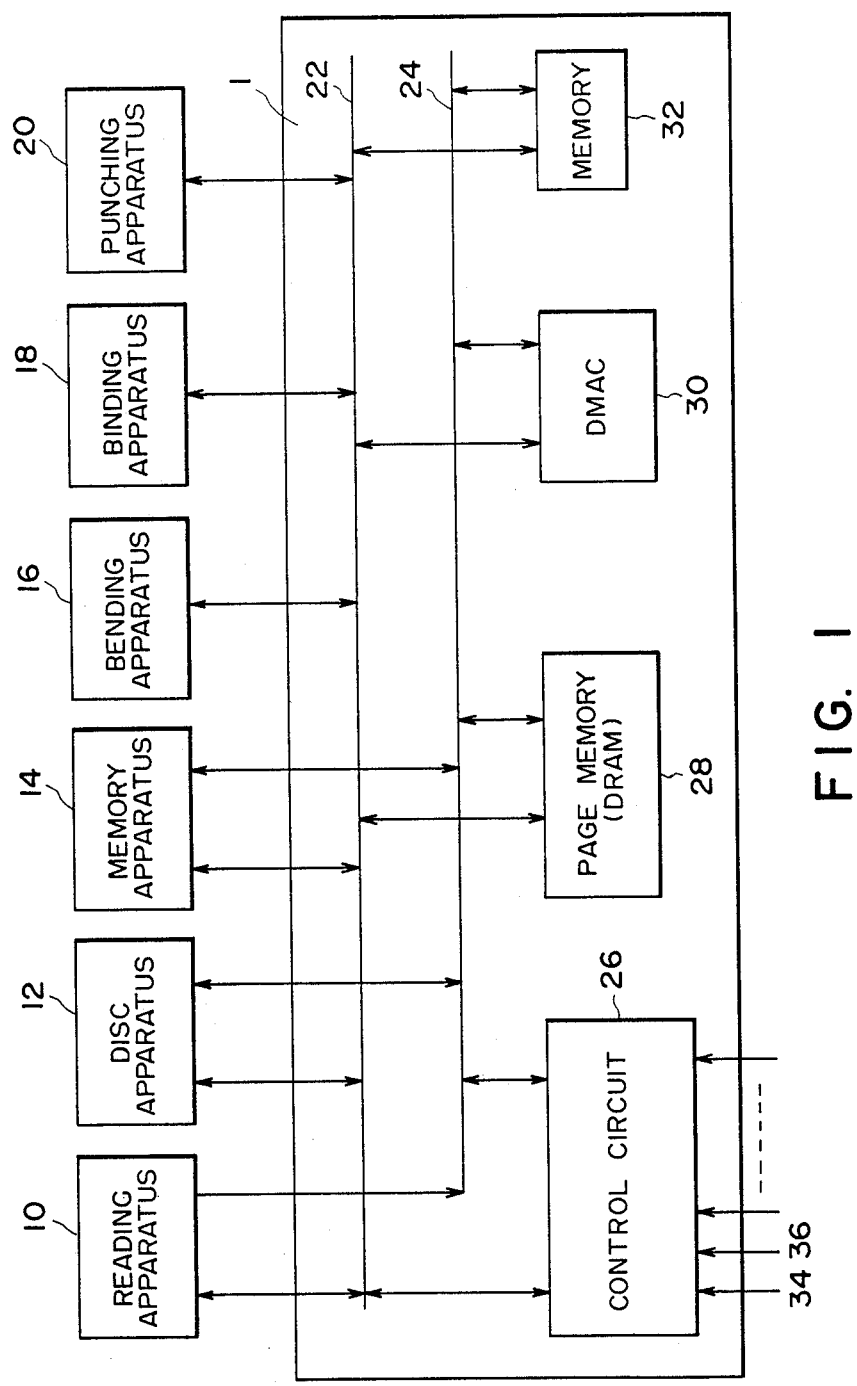
FIG. 1 is a block diagram of a system in which the present invention is applicable.

At first reference is made to FIG. 1 schematically showing a control system of the apparatus of the present invention. An original reading unit 10 reads an original image with a reading device as will be explained later. A magnetooptical disk unit 12 stores the image information read by the original reading unit 10, and transfers desired image information to a recording unit 14. The memory medium is not limited to a magnetooptical disk but can be replaced for example by an optical disk, a magnetic disk, or a floppy disk. A recording unit 14 records the image information released from the image reading unit 10 or the magnetooptical disk unit 12 on a recording sheet, by forming a latent image on a photosensitive member with a modulated laser beam. 1 indicates the entire electronic file apparatus, wherein a control bus 22 is used for controlling the various units in the electronic file 1 and other terminal units, and is connected for example with an unrepresented control unit provided in the recording unit 14 for controlling various components thereof. A data bus 24 is used for data transmission among the electronic file 1 and various attached units. A direct memory access controller (DMAS) 30 is used for data transmission, through the bus 24, among the terminal units and the various units in the electronic file 1. A control circuit 26 of the electronic file 1 performs data transmission and control among the terminal units and the various components of the electronic file 1. A page memory 28, composed of a DRAM, temporarily stores the image information read by the original reading unit 10, before storage in the magnetooptical disk 12 through the data bus 24. Also in case of recording on a recording sheet with the recording unit 14, the image information read from the magnetooptical disk 12 is temporarily stored in the page memory 28 and transferred then to the recording unit 14 through the data bus 24. A memory 32 stores, for example, the addresses of the original images stored in the magnetooptical disk.

A folding apparatus 16, a stapling (binding) apparatus 18 and a punching apparatus 20 constitute peripheral equipment of the recording apparatus 14 and effect post-processes to recording sheets discharged from the recording apparatus 14, according to signals supplied through the control bus 22.

A control circuit 26 receives various input signals for instructing a recording or reading operation, such as a print command signal 34 or a signal 36 for selecting either one-side or two-side information recording, as will be explained later.

[1. Disk unit]

Figure 2:
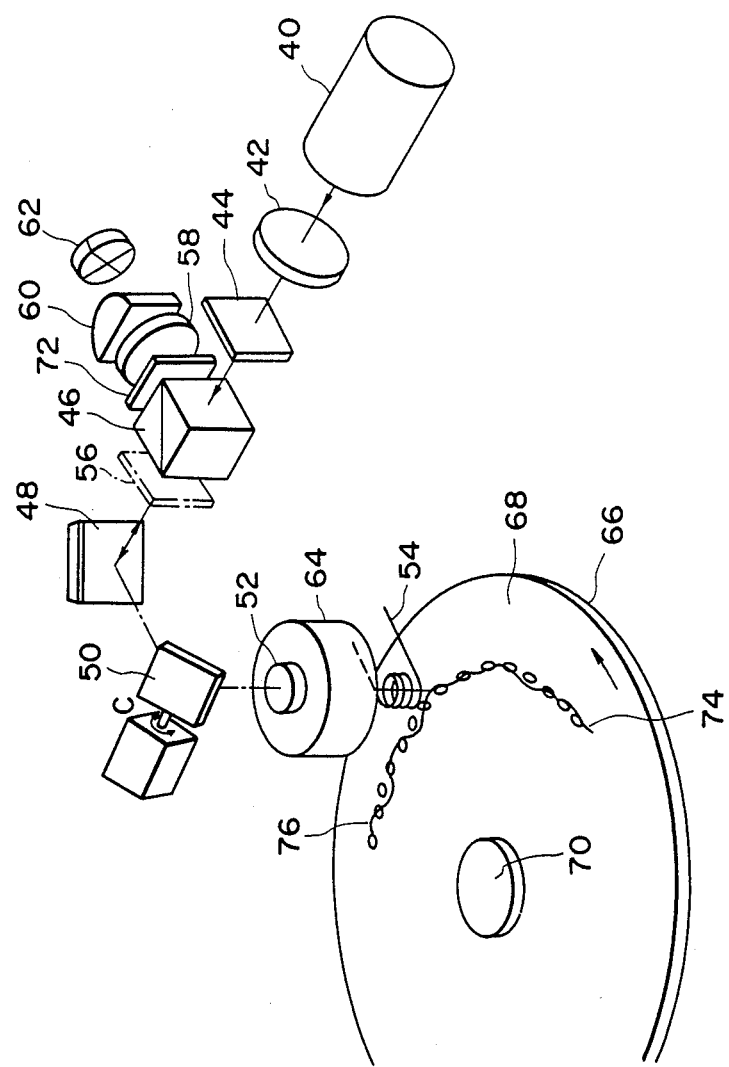
FIG. 2 is a perspective view showing the structure of a magnetooptical disk apparatus.

FIG. 2 shows an embodiment of the magnetooptical disk unit employed as a memory in the present invention, wherein provided are a semiconductor laser 40 for generating a light beam; a collimating lens 42; a polarizer 44; a polarizing beam splitter 46 provided with a polarizing layer; a mirror 48 for deflecting the light path; a known tracking galvanic mirror 50 rotatable in a direction C; a magnetic coil 54 for recording and erasing information signal; a magneto optical disk 66 rotatable in a direction indicated by an arrow about a shaft 70 and surfacially provided with a recording medium 68 such as a thin ferro magnetic layer; a $\lambda/4$ plate 56 which is employed only in information recording and is retracted from the optical path in reproduction or erasure of information; an analyzer 72; a condenser lens 58; a cylindrical lens 60; a photosensor 62 divided into four sections for detecting the state of tracking and focusing according to the received light and for generating information signal at the regeneration of information; a lens tube 52 holding an axially moving objective lens; and a lens drive unit 64 for axially moving the lens tube 52 to focus the light beam onto the recording medium 68 on the magnetooptical disk 66 and to repeatedly defocus the light beam at a high frequency for information erasure.

The methods of information recording, regeneration and erasure are already known and will therefore not be explained further.

[2. Original reading unit]

Figure 3A:
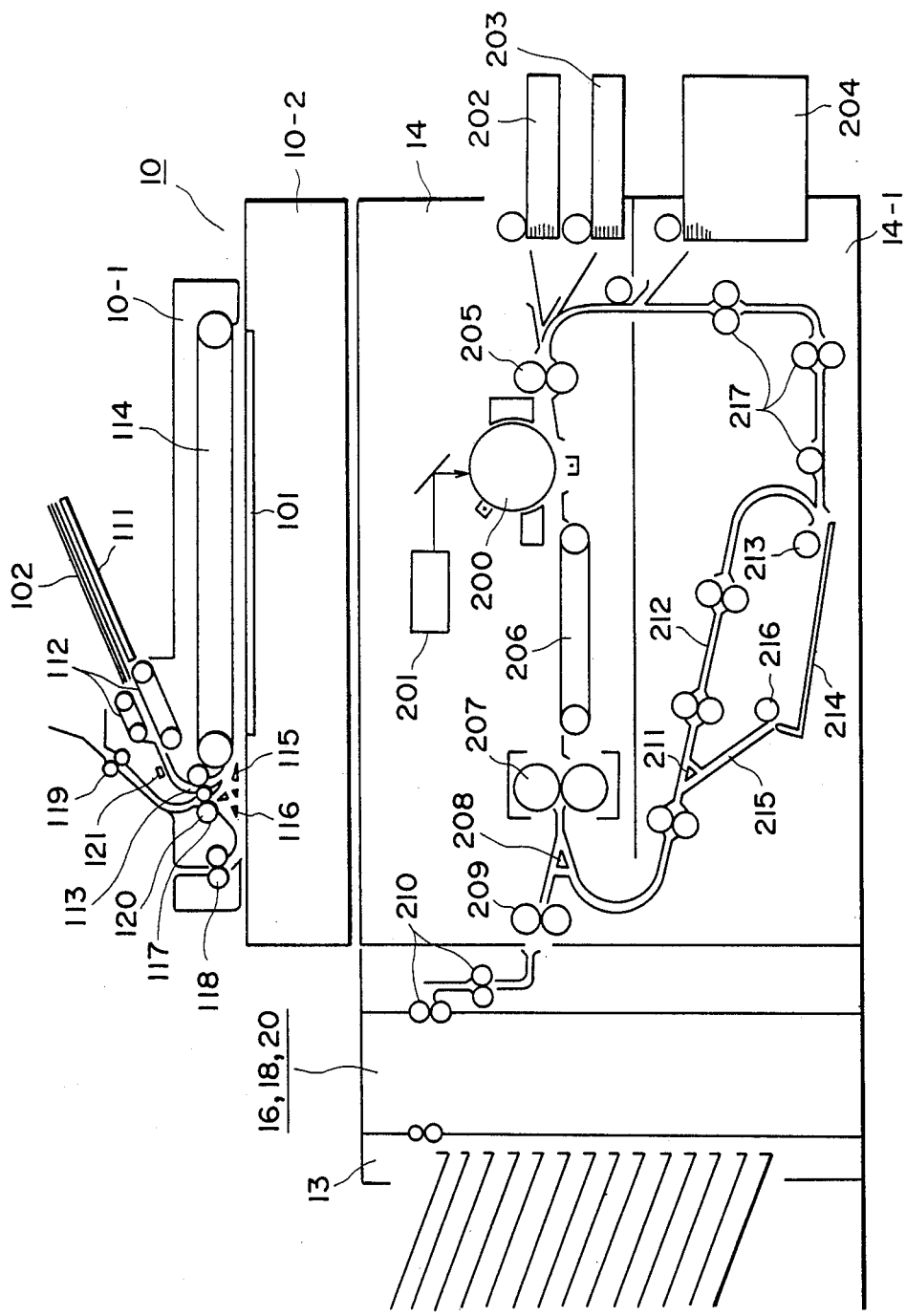
FIG. 3A is a cross-sectional view of a recording unit and a recording unit.
Figure 3B:
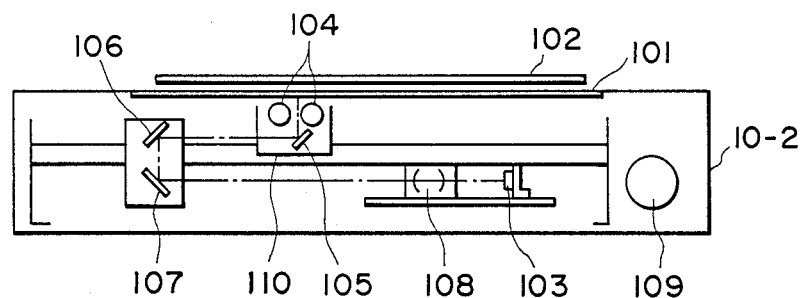
FIG. 3B is a cross-sectional view of a reading unit.

Now reference is made to FIGS. 3A and 3B for explaining the original reading unit or reader 10.

FIG. 3A is a cross-sectional view of the reader and the printer, and FIG. 3B is a cross-sectional view of a reading unit 10-2 of the reader 10. An original document 102 is placed on a platen 101 composed for example of a glass plate and is maintained in place by an original cover or a document feeder 10-1, and an image pickup 103, such as a CCD, comprising a linear array of plural photosensors is employed for reading the image information on said original document 102. The illuminating light from a light source 104 is reflected by said original 102, then guided by mirrors 105, 106, 107 and focused by a lens 108 onto said image pickup 103. The light source 104 combined with the mirror 105, and the mirrors 106, 107 are reciprocated along rails 110 with a speed ratio of 2:1 in order to scan the entire area of the original document. The light source unit, consisting of the mirrors 105, 106, 107 and the light source 104 moves at a constant speed under a phase-locked loop control by a DC servo motor 109. Said moving speed in forward motion from left to right is variable within a range from 90 to 360 mm/sec according to the image magnification, but is constant at 630 mm/sec in reverse motion from right to left.

The moving direction of said light source unit is called sub-scanning direction, which is substantially perpendicular to main scanning direction along which the photosensors of the image pickup 103 are arranged. A scanning operation consists of a forward motion of said unit from left to right during which each main scan line is read by the image pickup 103 with a resolving power of 400 dot/inch, followed by a reverse motion of said unit to the left end. The image read by the image pickup is stored serially in the page memory 28 in the form of digital signals representing the image density, and may be compressed by an unrepresented compression circuit. Now reference is made for explaining the function at original reading. One or plural original documents 102 are placed, with the image bearing face thereof upwards, on an original stacker 111 of a document feeder 10-1 of the reader 10. Upon actuation of a start key of the reader 10 by the operator, a command for original feeding to the document feeder 10-1, whereby the lowermost original on the stacker 111 is separated by a separating belts 112, advanced by transport rollers 113 and brought onto the platen 101 by a conveyor belt 114. A first face of the original is read in this state. Then the conveyor belt 114 is reversed, and the original is advanced from the platen 101 toward the transport rollers 118 by means of a deflecting cam 115. Said rollers 118 are temporarily stopped when an unrepresented sensor detects that the rear end of the original has passed the deflecting cam 116, and then are reversed whereby the original is forwarded toward a transport roller 120 through the deflecting cam 116. Said roller 120 is then reversed in the same manner as the transport rollers 118 whereby the original is advanced toward the conveyor belt 114 again by means of a deflecting cam 117. Through the above-explained steps the original document is inverted and placed on the platen 101, for reading a second face thereof. Subsequently the conveyor belt 114 is reversed again whereby the original is discharged toward transport rollers 120, 119. As already known the original document is so controlled as to precisely stop on the platen 101 by means of a sheet sensor 121 and other unrepresented sensors provided along the sheet path and an unrepresented timing pulse generator for generating pulses in synchronization with a roller driving system. Upon completion of image reading, the original is advanced toward the transport rollers 120, 119 by the conveyor belt 114 and the deflecting cam 115, then discharged by the roller 19 and placed on the originals 102 stacked on the stacker 111. On the originals 102 there is placed on unrepresented short bar in order to detect the end of a set of originals. The reader repeats the above-explained procedure until all the originals of a set stacked on the stacker 111 are read.

Figure 4:
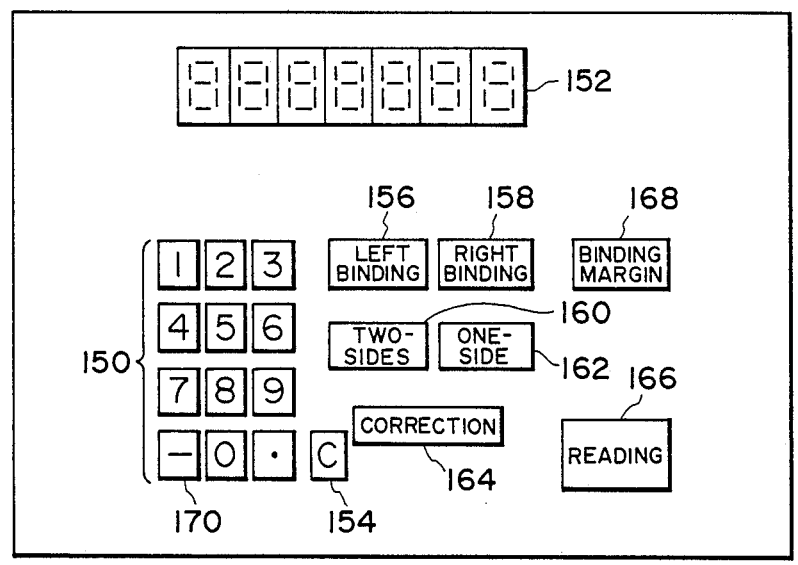
FIG. 4 is a plan view of an operation unit for image reading.

Now reference is made to FIG. 4 for explaining the operation unit of the reader 10.

(1) Input of number of the original to be read:

The number of the original to be read is entered by numeral keys 150, and the entered number is displayed on a display unit 152. An erroneously entered number can be cleared by a clear key 154 and corrected by reentry with the numeral keys 150.

(2) Designation of stapling direction of the original to be read:

The direction of stapling or binding is designated by a left-bind switch 156 or a right-bind switch 158 respectively if the originals are bound at left or right. Said switch need not be actuated if the image is positioned at the center of the original, and if the binding direction need not be designated.

(3) Designation of one-side or two-side original:

One-side originals or two-side originals can be selected respectively by a one-side switch 162 or a two-side switch 160 for controlling the method of transportation of the originals in the reader. Below these switches there is provided a correction switch 164, which is used for changing from two-side reading to one-side reading, or changing from one-side reading to two-side reading after an original reading switch 166 is depressed. Such change in original reading mode in the course of original reading operation is permissible because the correspondence between the record addresses of the read images and the pages is not affected. More specifically, said correction key does not alter the number of originals, image record addresses and order of original reading, but merely changes a calculation for determining the correlation between the record addresses of the read images on the magnetooptical disk and the pages, according to whether the original documents are one- or two-sided.

(4) Designation of binding margin:

In case of designating a binding margin in the original image filed on the magnetooptical disk in order to staple or punch the recroding sheets after image recording thereon, a binding margin switch 168 is actuated, and a number is entered with the numeral keys 150. In the present embodiment, the margin at left-end binding is taken as positive. Thus the margin for left-end binding is entered after depressing a minus key 170.

(5) Original reading command:

After the above-explained operations, an original reading switch 166 is depressed to start the original reading. However, the original reader and the order of original reading are not limited to the above-explained structure. For example there may be provided a sheet discharge unit separate from the sheet feeder. [3. Recording unit]

Now reference is again to FIG. 3A for explaining the recording unit or printer 14.

In response to a start command from the reader 10 or the disk unit 12, the printer 14 starts rotation of various mechanisms and activates high-voltage sources. After a predetermined preparatory operation, the feeding of a recording sheet is started from a designated level (upper cassette 202, lower cassette 203 or paper deck 204) in response to a sheet feed start signal from the reader 10 or the disk unit 12. The sheet is once stopped upon reaching registration rollers 205, and is advanced again in synchronization with latent image formation on a photosensitive drum 200 with a laser beam from a laser unit 201, modulated according to the image signal from the reader 10 or the disk unit 12.

According to already known electrophotographic process, the latent image on the drum 200 is rendered visible, and the developed image is transferred onto the transported recording sheet. Said sheet is then transported by a conveyor 206 to a fixing unit 207, whereby an image recording is made on a first face of the recording sheet. The sheet is then transported to a two-side unit 14-1 by a deflecting can 208. Said two-side unit 14-1 guides the sheet again to the photosensitive drum 200, either after sheet inversion through a path 212 in case of two-side recording, or without sheet inversion through a deflecting cam 211 and a path 25 in case of multiple recording, and the sheets guided to said unit 14-1 are stacked on an intermediate tray 214 by transport rollers 213 or 216. After a desired number of sheets, bearing images on the first face thereof, are stacked on the tray 214, and, in response to a second side copy start command from the reader 10 or the disk unit 12, said sheets are one by one transported by a transport roller 213 from the tray 214, and are guided through transport rollers 217 to the registration rollers 205. The image formed on the drum 200 is then similarly transferred, and the sheet is transported through the fixing unit 207 and the deflecting cam 208, then through transport rollers 209, 210 and the folding unit 16, stapling unit 18 and punching unit 20 and finally discharged to a sorter unit 13. In this manner the image recording is made on one or two faces of the recording sheet. The foregoing commands may also be provided by the control circuit 26, instead of the reader 10 or the disk unit 12 as explained above. The sorter 13, being advised of an operation mode selected from sorting mode, grouping mode and non-sorting mode at the start of the recording operation, functions according to said operation mode when a sheet is detected by an unrepresented sensor provided at transport rollers 210. For example in the sorting mode, the sorter bins are elevated by a step after each sheet discharge, for guiding a next sheet to a next bin. In the grouping mode the bins are elevated when the original document is changed, and, in the non-sorting mode, the sheets are always discharged to the uppermost bin.

Figures 5A, 5B:
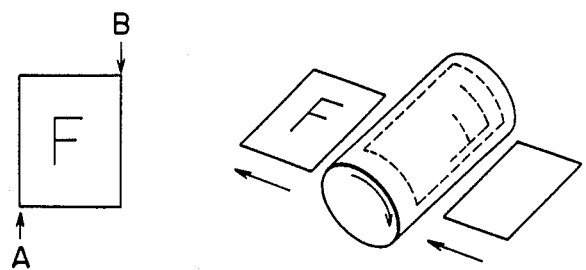
FIGS. 5A to 5C are schematic views showing a recording sheet and an image formed on a drum.
Figure 5C:
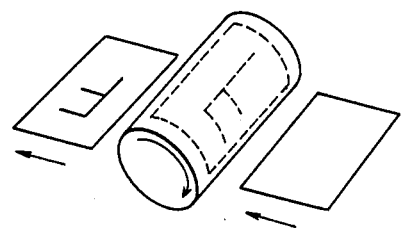

A two-side copying operation is conducted in the above-explained manner. Also a one-side copying operation can be achieved by eliminating the inverting operation in the document feeder and in the two-side unit. Also it is possible to overlay plural images on a face of the sheet by providing the two-side unit with a path for refeeding the recording sheets without inversion In the following there will be explained directional and positional control of the image formed on the sheet, through a processing on image information. The direction of image formed on the sheet is defined as follows. With respect to an original image shown in FIG. 5A, an image formed as shown in FIG. 5B is called erect when viewed by the operator, and an image as shown in FIG. 5C is called inverted. Such image direction can be changed by storing the image information in the page memory 28 composed of one or plural DRAM's and controlling the read start position and the reading direction of said memory.

Figure 6:
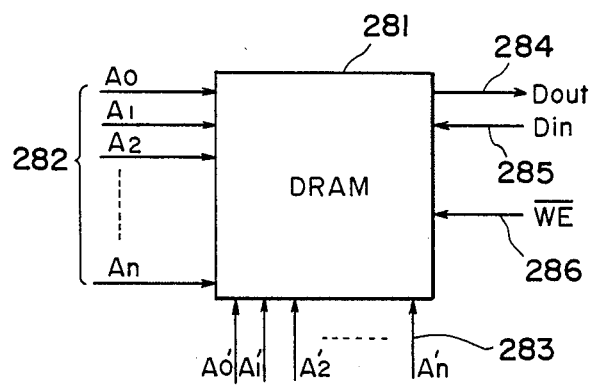
FIG. 6 is a view showing inputs and outputs of a DRAM.

FIG. 6 shows a DRAM constituting said page memory 28, wherein shown are a memory cell 281, row address lines 282; column address lines 283; a data output line 284; a data input line 285; and a write enable signal line 286. The data are stored in the memory cell 281. Each bit is stored at a matrix point designated by the row address and column address. When the page memory stores the image information as shown in FIG. 5A, an erect image as shown in FIG. 5B can be obtained by exposing the drum 200 with the start address at A and transferring the obtained toner image onto the recording sheet, while an inverted image as shown in FIG. 5C can be obtained with the start address at B.

Then, the image position with respect to the recording sheet can be varied by displacing the front end of the toner image, corresponding to the latent image formed on the photosensitive drum 200 with respect to the front end of the recording sheet. More specifically said displacement can be achieved by varying the timing of sheet feeding by the registration rollers 205, or that of scanning with the laser beam. [4. Sheet post-processing apparatus]

In the following there will be explained the stapling unit 18, folding unit 16 and punching unit 20 in reference to FIGS. 7, 8 and 9. These units are connected to the recording apparatus and are controlled through the control bus 22. These units are however not essential and may be removed if not required.

Figure 7A:
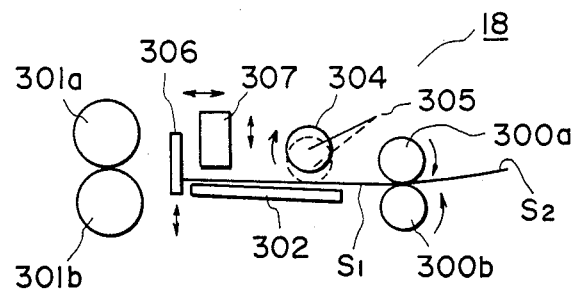
FIGS. 7A and are views showing the structure of a stapler unit.
Figure 7B:
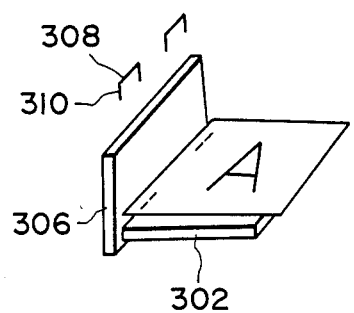

(A) Stapling unit:

FIGS. 7A and 7B show the structure of a stapling unit, wherein recording sheet S1 transported by the transport rollers 210 are advanced by continuously rotating transport rollers 300a, 300b and are aligned by a stopper 306. The recording sheet released from the transport rollers 300a, 300b temporarily stops on a fixed guide member 302. Then a feed roller 304 vibrating about a point 305 is brought into contact with said sheet, is rotated for a certain period in a direction indicated by an arrow and then returns to the full-lined position, whereby the recording sheet is stopped at a position in which the front end thereof abuts against said stopper 306. A next sheet S2 is also similarly aligned by the stopper 306 and is stacked on the sheet S1 already stopped. When all the sheets to be bound are stacked on the guide member 302, or when the number of said sheets reaches the stapling limit, a stapling device 307 is lowered to staple said sheets. The stapling is conducted in a direction shown in FIG. 7B. After the stapling operation, the stapling device 307 is lifted to the original position, and the stopper 306 is lifted to form a transport path. Then the feed roller 304 is lowered to the broken-lined position and rotates in contact with the recording sheets, for a period enough for the front end of the sheets to reach the transport rollers 301a, 301b.

When the stapling unit 18 is not used, the stopper 306 is maintained lifted to form the transport path, and the feed roller 304 is maintained in the broken-lined position and continuously rotated, whereby the recording sheet passing on the fixed guide member 302 is advanced by said roller to the transport roller 301a, 301b. The stapling device 307 is retracted above the transport path in order not to hinder the movement of the recording sheet.

The stapling device 307 is rendered movable in the advancing direction of the sheet by means of an unrepresented mechanism, in order to vary the stapling position.

In FIG. 7B, 308 indicates a base portion of a staple for holding the sheets, and 310 indicates end portions of the staple.

Figure 8A:
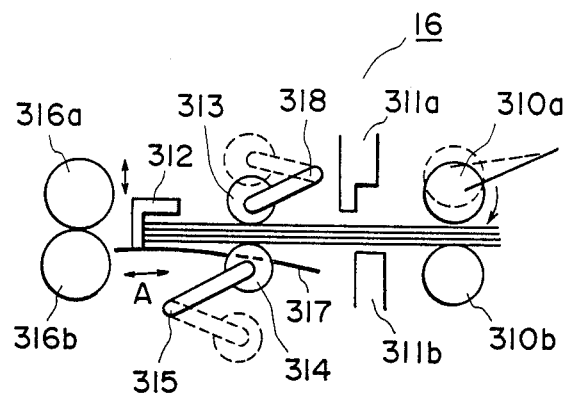
FIGS. 8A to 8C are views showing the structure of a folding unit.
Figure 8B:
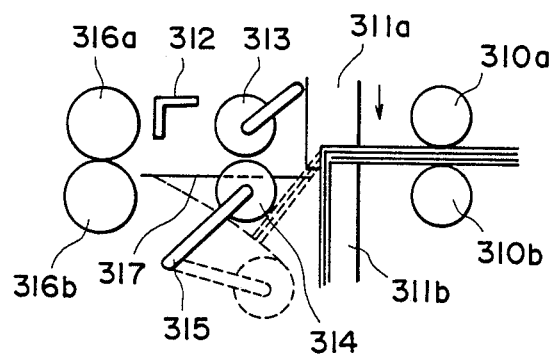
Figure 8C:
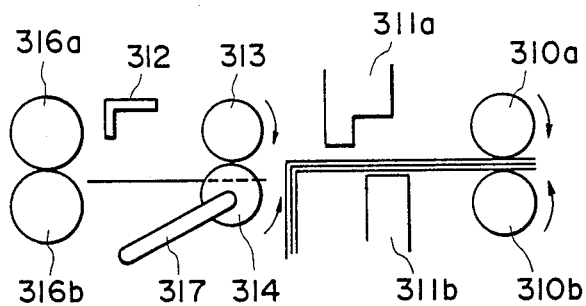
Figure 9:
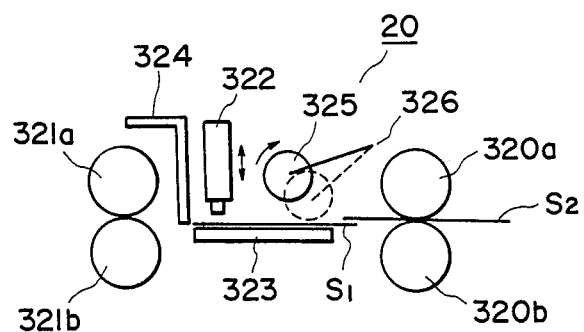
FIG. 9 is a view of a punching unit.

(B) Folding unit:

FIGS. 8A to 8C illustrate the function of the folding unit, wherein FIG. 8A shows the alignment of transported sheets, FIG. 8B shows the state of sheet folding, and FIG. 8C shows the sheet transportation after folding.

(1) A first sheet is transported and is gripped by feed rollers 310a, 310b. The roller 310a continues rotation until the front end of the sheet abuts on a stopper 312, which is movable in a direction A by means of an unrepresented mechanism according to the sheet length, in order to regulate the length of folding. Said length of folding is determined by the selected sheet size. In FIGS. 8A to 8C, there are provided paired rollers 313, 314 which are for improving the transportability of sheets and are rendered rotatable about points 318, 315 respectively. A support member 317 for supporting the recording sheet from below is composed of an elastic member such as a polyester film and is provided with a notch corresponding to the position of the roller 314.

The rollers 313, 314 thus transport the first recording sheet when it is transported.

(2) When the second sheet is transported, the roller 310a is lowered to the solid-lined position to advance said sheet. The roller 313 is retracted to the broken-lined position when the front end of the sheet reaches the vicinity of the solid-lined position of the roller 313, and the roller 310a is stopped and is retracted to the broken-lined position when said front end exceeds the solid-lined position of the roller 313. Subsequently the roller 313 porceeds to the solid lined position and rotates until the front end of the sheet reaches a stopper 312. The foregoing procedure is repeated for a third and subsequent sheets.

Now reference is made to FIG. 8B. The rear end of the sheet is held by the rollers 310a, 310b, and the roller 314 is retracted to the broken-lined position. An upper folding member 311a is lowered and fold the sheet by 90° in cooperation with a lower folding member 311b. In this state the elastic support member 317 is bent by the sheets to a broken-lined position, but returns to the solid-lined position after the folding operation.

FIG. 8C shows an operation of transporting thus folded recording sheets. The rollers 310a, 310b supporting the rear end of the folded sheets start rotation. The sheets are thus advanced, while being further folded by rollers 313, 314, to rollers 316a, 316b. The stopper 312 is moved to a position retracted from the transport path.

Though FIGS. 8A to 8C illustrate folding of plural sheets at the same time, a single sheet may also be folded by similar operations.

(C) Punching unit:

Basic operations are same as those of the stapling unit 18 shown in FIGS. 7A and 7B. Sheets transported from the folding unit 16 are advanced by continuously rotating transport rollers 320a, 320b, and the front ends of said sheets are aligned by a stopper 324.

The front end alignment of the sheets is conducted in the following manner. After released from the transport rollers 320a, 320b, the sheet temporarily stops on a fixed guide member 323. Then a feed roller 325 rotatable about a point 326 is brought into contact with said sheet, then rotated in a direction of arrow for a predetermined period, and is then returned to the solid-lined position, whereby the front end of the recording sheet abuts on the stopper 324. A succeeding sheet S2 is similarly aligned by the stopper 324, and is stacked on the already stopped sheet S1.

When all the sheets to be punched are stacked on the guide member 323, or when the number of sheets reaches the punching capacity, a punching device 322 is lowered to punch said sheets. After said punching the punching device 322 returns to the upper original position, and the stopper 324 is lifted to form a transport path. Then the feed roller 325 is lowered to the broken-lined position in contact with the sheets, and is rotated to feed the sheets one by one from the top. Only one feeding suffices if the sheets are already bound by the stapling unit.

When the punching unit 20 is not used, the stopper 324 is lifted to clear the transport path, while the feed roller 325 is continuously rotated at the broken-lined position, whereby the sheet passing the fixed guide member 323 is advanced to transport rollers 321a, 321b. The punching device 322 is retracted from the sheet path in order not to hinder the transportation of the sheet.

In the following there will be explained steps of forming a toner image, according to the image information, on the recording sheet and applying post-processes when required.

The recording apparatus of the present embodiment is capable of image recording in one of:

(1) a mode of recording an image on a side of the recording sheet;

(2) a mode of recording an image on each side of the recording sheet;

(3) a mode of recording two images on a side of the recording sheet; and (4) a mode of recording two images on each side of the recording sheet.

Figure 10:
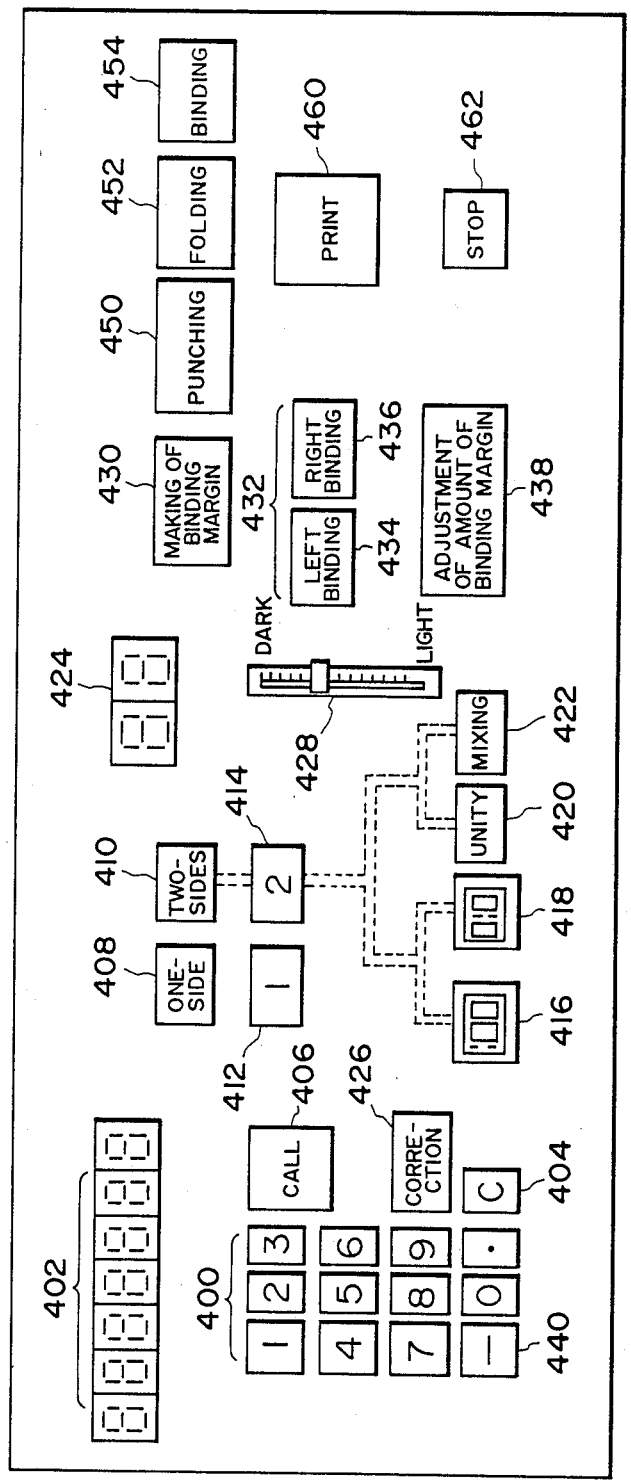
FIG. 10 is a plan view of an operation unit for image recording.

Now reference is made to FIG. 10 for explaining the operation required in case of recording the image information stored in the magnetooptical disk by means of the recording apparatus 14, and applying post-processes when required.

(1) Designation of file number to be read:

A desired file number of the image information to read and recorded is entered by numeral keys 400, and the entered file number is displayed on a display unit 402. The entered number can be corrected by actuating a clear key 402 and repeating the input operation.

(2) Image reading instruction:

An instruction to read a file, corresponding to thus entered file number, from the magnetooptical disk 12 is given by actuation an image reading button 406. A lamp inside said button is lighted when a head of the magnetooptical disk unit 12 locates the designated file number, but it repeats flashing if said file number cannot be found.

(3) Designation of one-side or two-side recording:

Image formation by the recording apparatus 14 either on one side or on two sides of the recording sheet is designated by the actuation of a one-side switch 408 or a two-side switch 410, and a lamp incorporated in the actuated switch is lighted.

(4) Designation of number of images:

Formation of one or two images on a side of the sheet is designated by a key 412 or 414. In the present embodiment, in case of one image formation, an A4-sized image is formed on a side of an A4-sized sheet of a corresponding cassette mounted on the recording apparatus, and, in case of formation of two images, two A4-sized images are formed side by side on an A3-sized sheet from a corresponding cassette.

Naturally the sizes of the image and the sheets are not limited to such example.

Figure 11A:
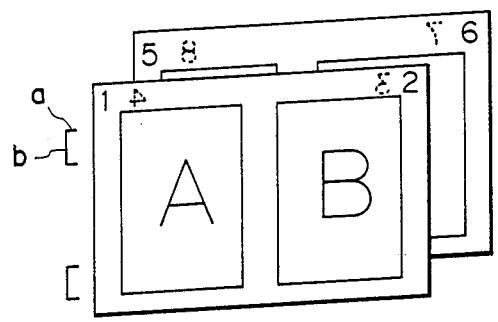
Figure 11B:
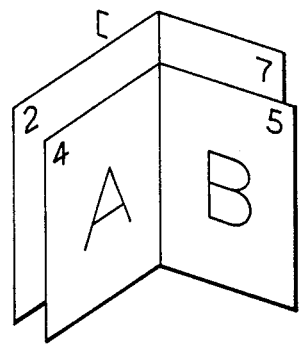

(5) Designation of stapling position:

In case of forming two images in two-side recording mode, the images can be formed in two modes as shown in FIGS. 11A and 11B. In one mode the sheets are bound at right or left end, and the pages are in correct order when the sheets are turned over in this state, while in the other mode the sheets are bound at the center and the pages are in correct order when the pages are turned over in this state. Either mode can be selected by actuating a switch 416 or 418.

(6) Selection of single or mixed sheet size mode:

In case of forming two images on a side of the sheet, images are not formed on the sheet according to the number of pages. For example, if the number of pages is represented by $J=4K+2$ ($K=0, 1, 2, \ldots$), there will result a sheet without image on the rear side in the two-side recording mode. Also if the number of pages is represented by $J=2K+1$ ($K=0, 1, 2, \ldots$) there will result a sheet not bearing image on a half in case of one-side recording mode. In order to avoid such waste in sheet, it becomes necessary to mixed A4-sized recording sheets. For example, in the above-mentioned case of two-side recording with the number of pages of $J=4K+2$ ($K=0, 1, 2, \ldots$), an A4-sized sheet is employed as the last sheet and images are recorded on both sides thereof. Also in case of the one-side recording mode with the number of pages of $J=2K+1$ ($K=0, 1, 2, \ldots$), an A4-sized sheet is employed as the last sheet and an image is recorded on a side thereof. Thus, even in case of forming two images on a side of the sheet, it is possible to avoid the waste in sheet by mixing a mode for forming an image on a side. On the other hand, there is another mode in which two images are formed on the sheets of a same size (A3) regardless of the number of pages. Either of these two modes can be selected by actuating a single size switch 420 or a mixed size switch 422.

(7) Setting of the copy number:

A number of copies to be made from the file designated in the step (1) is entered by the numeral keys 400 employed in said step (1), and the entered number is displayed on a display unit 424.

The entry of the copy number is effected after the presence of the file number to be read from the magnetooptical disk is confirmed by the image reading command of the step (2). The file number to be read may be corrected by actuating a correction key 426, positioned alongside the numeral keys 400, and repeating the entry of a file number.

(8) Setting of image density:

The density of the image to be formed on the recording sheet can be adjusted with a density adjusting lever 428.

(9) Designation of forming a binding margin:

A binding margin switch 430 is actuated in case of automatically forming a binding margin for enabling the stapling or punching of the recording sheets. If the image stored in the magnetooptical disk has no binding margin, there is automatically secured a predetermined binding margin. On the other hand, if the stored image already has a binding margin, the image is formed with thus already existing margin whether or not the binding margin switch is actuated.

The presence of a binding margin in the original documents is detected at the image reading, and the information of said detection is stored on the magnetooptical disk.

(10) Designation of binding direction:

The binding direction of the copies prepared by the recording apparatus is designated by binding direction keys 432 shown in FIG. 10. The binding direction of the original documents is entered at the storage of the image information on the magnetooptical disk, and is read when the desired file number is searched whereby a lamp is lighted in a key 432 corresponding to the binding direction. If the recording is instructed without the designation of the binding direction, the binding direction of the recording sheets is determined by the information of the binding direction stored in the magnetooptical disk. This is to prepare the copies in a form as close as possible to that of the original documents, and provides an operational advantage that the operator need not designate the binding direction. However, if the operator desires copies bound at right from the original documents bound at left, the binding direction is designated by depressing the right-bound key 436.

(11) Adjustment of binding margin of the copies:

For adjusting the amount of binding margin on the sheet, a binding margin adjust switch 438 is actuated, whereby a display unit 402 displays the binding margin stored in the magnetooptical disk. When "0" is displayed for example, a binding margin is entered by the numeral keys 400 and is displayed on the display unit 402. To reduce the binding margin, the minus key 440 is actuated and a number is then entered by the numeral keys 400. Also instead of displaying the margin with a number, it is possible to enter information, at the storage of the image information, whether the original has enough margin for stapling or punching and to display a message "binding margin present" or "binding margin absent" on the display unit 402.

If said adjust switch 438 is not actuated, the image is formed on the sheet automatically with a binding margin to be determined as will be explained later. The amount of binding margin may also be changed in the course of a recording operation, if the margin found on a discharged sheet is identified to require an adjustment. However if an adjustment of the binding margin is instructed in the course of image information recording on the photosensitive drum with the laser beam, said instruction becomes only effective for a succeeding recording operation. The entered value for adjustment is stored in the memory 32, and the adjustment is achieved, according to said value, by controlling the start of exposure or the timing of sheet feeding by the registration rollers. More specifically the binding margin at left-hand side of the sheet is increased by delaying the exposure or advancing the sheet feeding, and the binding margin at right is increased by advancing the exposure or delaying the sheet feeding. If said adjustment of the binding margin is not instructed, the image information stored in the magnetooptical disk is recorded, without change, on the recording sheet, by the recording apparatus.

(12) Instruction for sheet post-process:

Post-processes can be designated if the post-process units, such as the stapling unit 18, punching unit 20 and folding unit 16 are connected to the recording apparatus 14.

In FIG. 10 there are shown a punch instruction switch 450, a folding instruction switch 452, and a stapling instruction switch 454. In case of two-side recording mode with formation of two images on each side explained in the step (5), the stapling is effected at a designated position, in response to the actuation of the stapling instruction switch.

(13) Recording instruction:

After the setting of recording and/or post-process conditions in the foregoing steps (1) to (12), the recording operation is initiated by the actuation of a print switch 460. The recording operation may be interrupted by a stop switch 462.

In the following there will be explained a mode of recording an image on a side of the sheet.

In selecting said mode, the recording mode and post-process explained above are selected, and these operations will be explained with reference to the flow charts shown in FIGS. 12A to 12D.

At first the "one image" switch 412 is depressed to select one image formation on a side of the sheet, and the "one-side" switch 408 is depressed for selecting one-side recording. Then necessary post-processes are selected, but the folding instruction is meaningless and is therefore not accepted. Also there is selected the presence or absence of binding margin. When the punching and stapling are instructed for a same sheet after image formation, the stapling becomes less effective if both operations are effected at the same position, as shown in FIGS. 13C and 13D. In FIGS. 13A and 13B, L1 indicates the stapling position when it is independently conducted, and L3 indicates the punching position when it is independently conducted. Depending on the values of L1 and L3 and on the size of punched holes, the staples may be damages by the punching device as shown in FIG. 13C, or the sheets become easily breakable because the punched holes are positioned too close to the staples as shown in FIG. 13D. Therefore, if the stapling and punching are both instructed, the position of at least either is moved from the original stapling or punching position. FIG. 13B shows such state in which the stapling is conducted a position L2 (>L3). More specifically, the stapling is effected at L2 or L1 respectively when the puching is instructed or not (steps 21-24).

Figure 12A:
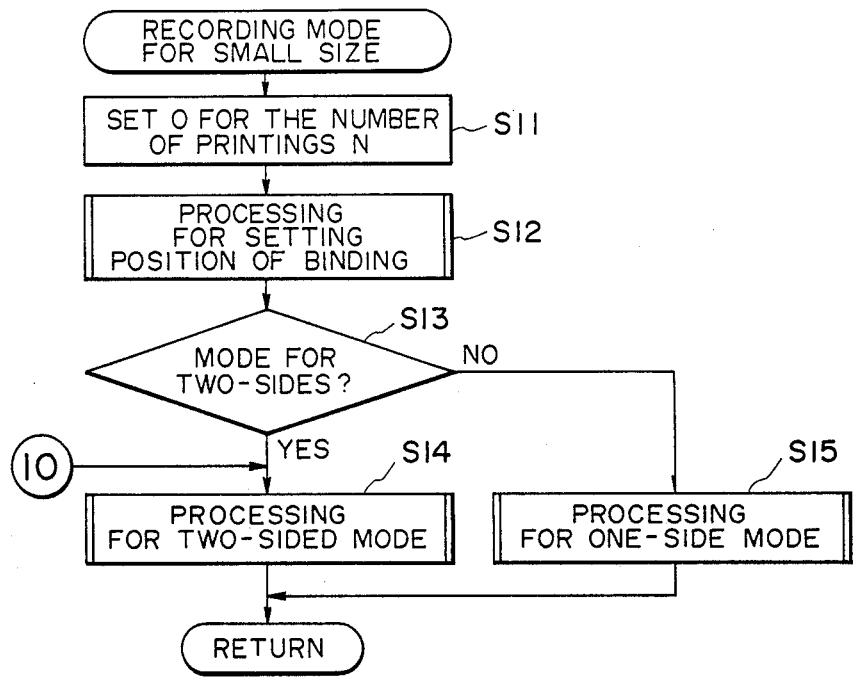
Figure 12B:
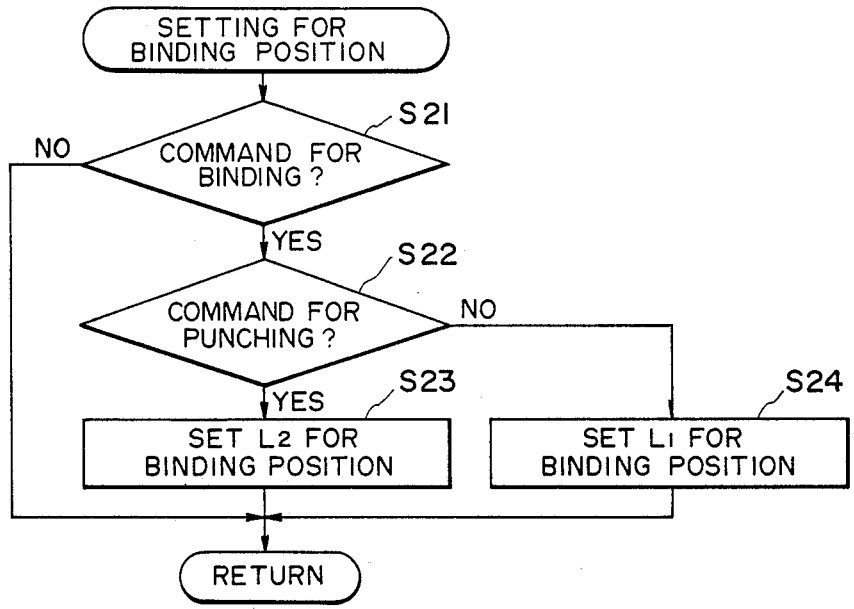
Figure 12C:
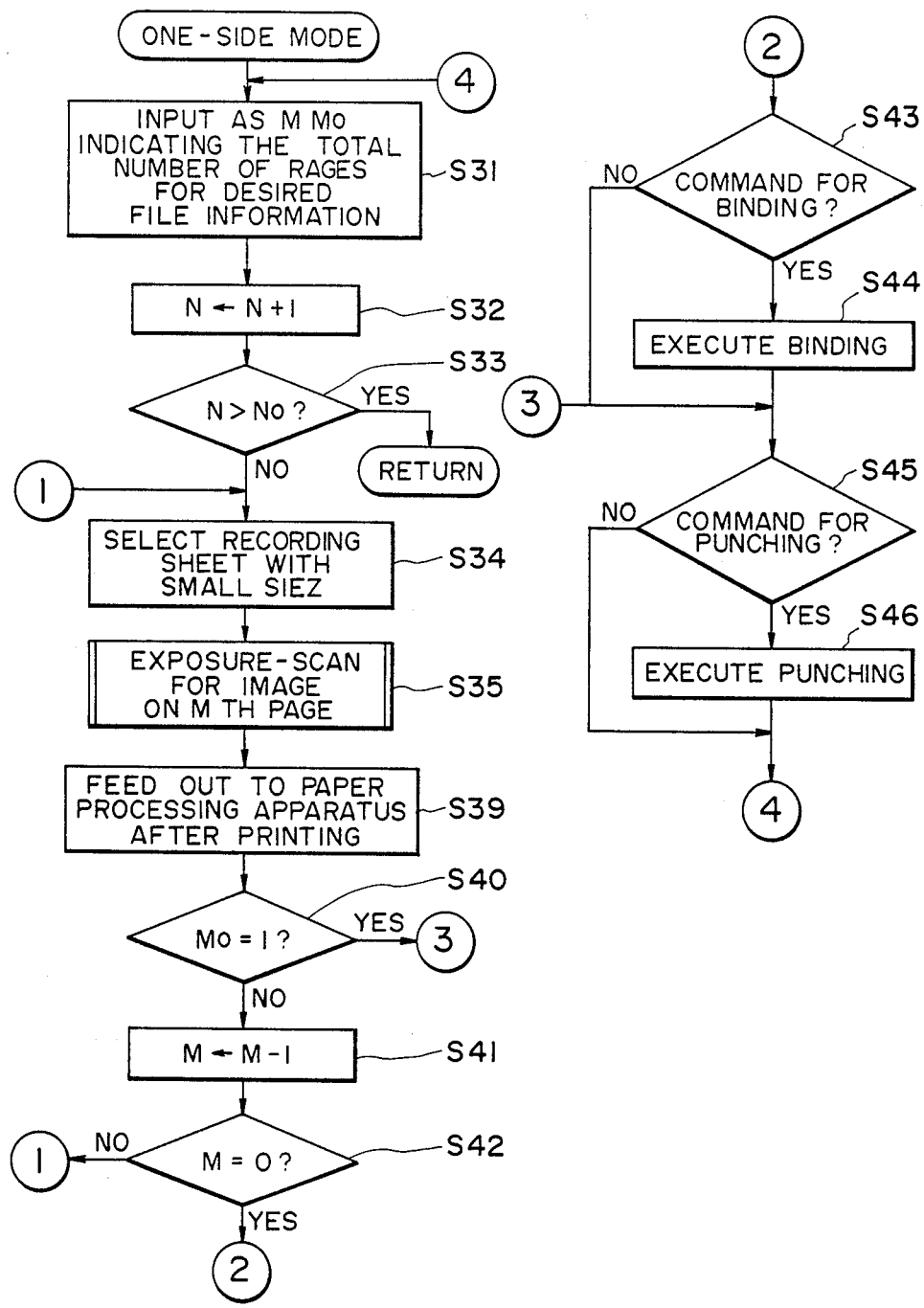
Figure 12E:
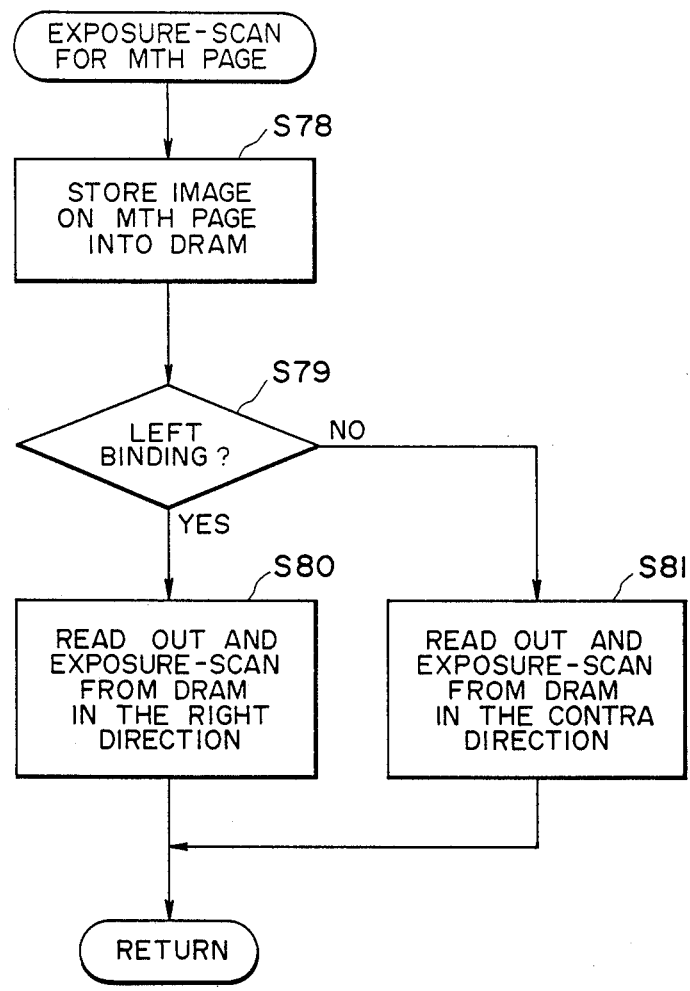

In case of the one-side mode, a sequence shown in FIG. 12C is followed. At first the number of total pages of the desired file to be printed is read from the memory 32 as a variable MO, which is substituted as a variable M indicating the print pages (step 31). Then a variable N indicating the number of copies is increased by one (step 32), and is compared with the preset copy number (step 33). If the preset copy number is not yet reached, a small size recording sheet is selected (step 34), and an image of M-th page is read to effect exposure on the photosensitive drum with the laser beam (step 35). Said exposure of the M-th page is conducted, as shown in FIG. 12E, by reading the image of M-th page from the disk unit (step 78), discriminating whether the left-binding mode is selected (step 79), then exposing the drum by reading the image of M-th page in normal direction from the DRAM if the left-binding mode is selected (step 80), or by reading said image in inverse direction if the right-binding mode is selected (step 81) and recording on the sheet and discharging the same to the post-process unit (step 39). If the read file consists of only one page, the instruction of stapling operation is not accepted since it is meaningless (step 40). If there are plural pages, the variable M is reduced by one in order to read a preceding page (step 41), then a discrimination is made whether all the pages have been printed (step 42), and, if not printed, the program returns to the step 34 for recording the next page. On the other hand, if all the pages have been printed, there is discriminated whether the stapling is instructed (step 43), and, if instructed, a stapling operation is conducted (step 45). Also there is discriminated whether a punching is instructed (step 44), and, if instructed, a punching operation is conducted (step 46). Then the sheet is discharged to the sorter, and the foregoing procedure is repeated until the preset copy number is reached.

In the exposure operation in the steps 80 and 81, the direction of image and the image position on the sheet have to be considered. For example, in case of forming an image on a side, in the one-side recording mode, the direction and position of the image are to be determined in relation to the facts (1) whether the original image information in the magnetooptical disk is obtained from one-side or two-side originals, (2) whether the originals are bound at right or left, (3) whether the original information has a binding margin, and (4) how large is the binding margin. Also the exposure operation varies whether post-processes by the stapling unit or the punching unit connected to the recording apparatus are instructed. These cases will be explained in the following.

(1) In case of one-side original without binding margin:

A binding margin, if necessary, is secured by actuating the binding margin switch 430, and can be regulated, if necessary, by the binding margin adjust switch 438 and by the entry with the numeral keys 400.

(A) In case of stapling or punching:

The position of the stapling or punching device and the image direction need to be controlled in order to match the stapling or punching position with the binding direction. For example, in case the stapling device 307 of the stapling unit is fixed at a downstream position in the advancing direction of sheet, the left-bound copies can be obtained by so effecting the exposure operation as to obtain an erect image, while the right-bound copies can be obtained by so effecting the exposure operation as to obtain an inverted image (see FIGS. 14A-14C, wherein the latent image is represented by a broken-lined pattern on the photosensitive drum 200). On the other hand, if the stapling device is movable, it can be positioned as shown in FIG. 14A or in FIG. 14C for obtaining images bound at left or at right, respectively.

(B) Case of securing a binding margin only:

In this case the recording is made with an erect image, in order to facilitate the necessity of adjustment of the binding margin. In response to the actuation of the binding margin switch 430, the image is moved by a predetermined distance to secure a binding margin. Said distance is stored in the control unit 26. Said binding margin may be increased or decreased by the binding margin adjust switch 438.

(2) Case of one-side original with binding margin:

(A) When the binding direction of the original is same as the selected binding direction of copies:

Since the binding direction of the original and the amount of binding margin thereof are already stored at the storage of the original image information in the magnetooptical disk, a recorded image with a binding margin same as that in the original can be obtained by merely actuating the print switch 460.

(a) Case of binding or punching:

The position of the stapling device and the image direction are to be so controlled as to match the binding position with the binding direction.

(b) Case of securing a binding margin only:

An erect image is employed in this case since the operation is same as the case of securing a binding margin only for a one-side original without binding margin.

(B) When the binding direction of the original is different from that designated for copies:

In this case the image position has to be considered for forming a binding margin. For example, in case of obtaining copies bound at right as shown in FIG. 15B from the originals bound at left as shown in FIG. 15A, the image has to be moved to left by L2−L1 (L2>L1). For this purpose it is possible to control the start of exposure with the laser beam corresponding to the front end of the recorded image, or the timing of sheet feeding by the registration rollers.

As already explained, the binding margin may be further regulated by the binding margin adjust switch 438.

(a) Case of stapling or punching:

The position of the stapling or punching device and the image direction are to be so controlled as to match the stapling or punching position with the binding direction, in the same manner as in the case of one-side originals without binding margin.

(b) Case of securing binding margin only:

An erect image is employed in recording because the situation is same as in the case of securing a binding margin only for one-side originals without binding margin.

(3) Case of two-side originals without binding margin:

The record format on the magnetooptical disk is same as in the case of one-side originals without binding margin, so that the direction and position of image can be determined accordingly.

(4) Case of two-side originals with a binding margin:

In this case, the image direction can be considered same as in the aforementioned case of one-side originals without binding margin. However, if a binding margin is required, the image position has to be determined according to whether the binding direction of the originals is same as that designated for the copies.

In the following explanation, [ ]indicates a case where the binding direction of the originals is different from that designated for the copies. FIG. 16A shows a two-side original bound at left, while FIG. 16B indicates that the top side of said original has an image A and the botoom side thereof has an image B. FIG. 16C indicates the image position in case the binding direction designated for the copies is same as that of the original (at left), while FIG. 16D indicates the image position in case the copies are bound at right, different from the binding direction of the originals. A′, A″, B′ and B″ are recorded images respectively corresponding to the original images A, B. As shown in FIGS. 16A to 16D, the recorded image A′ [A″] of the original image A is bound at left [right] which is same as [different from] the binding direction of the original documents.

Thus, as in the aforementioned case of one-side originals with a binding margin of which binding direction is different from that of the copies, a desired recorded image can be obtained by modifying the image position on the bottom [top] side of the sheet in case the binding direction of the originals is different from [same as] that of the copies.

Figure 17A:
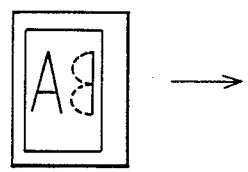
Figure 17B:
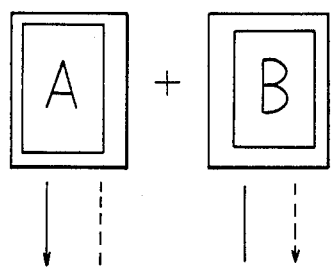

FIGS. 17A to 17D illustrate two-side originals bound at right, but detailed description will be omitted since the relation will be apparent from FIG. 16A to 16D. FIG. 17A shows a two-side original bound at left, while FIG. 17B indicates the top and bottom sides of the original. FIG. 17C indicates the image position in case the binding direction designated for copies is same as that of the originals at right, and FIG. 17D indicates the image position in case the binding direction designated for copies is different from that of the originals. Furthermore, as already explained before, the recorded image position may be regulated with the binding margin adjust switch 438.

The scanning exposure operation is still associated with certain technical problems, of which solutions will be explained in the following.

(1) Change of direction of recorded image:

It is already explained that the direction of recorded image can be changed by varying the read-out start points of the row and column addresses in reading the image information to be recorded from the DRAM. However, if the file to be printed is composed of plural pages, the direction of image should remain same throughout said file when the recording of said file is completed, even if a change in the image direction is instructed in the course of the printing operation.

For example, if a change in the image direction is instructed after the printing of the second page and the control unit 26 changes the image direction from the third page in response to said instruction, erect images and inverted images will be mixedly present in the recording sheets. Consequently the operator is required to align the direction of images and the images may be partly hidden or punched if such sheets are subjected to stapling or punching. For this reason, after the image of the first page is recorded on the recording sheet, the control unit 26 does not change the read-out direction of the row and column addresses until the completion of recording of a file, disregarding any instruction for changing the image direction entered thereafter. Such operation is not limited to the above-explained mode of forming an image only on one side of the sheet, but is similarly realized in:

(1) mode of forming an image on each side of the sheet;

(2) mode of recording two images on a side of the sheet; and (3) mode of recording two images on each side of the sheet.

(2) Sheet binding and order of page output:

In case of stapling the sheets discharged from the recording apparatus, the order of pages is so controlled that the supporting portion of the staple is positioned at the first page. FIG. 3A shows the image recorded on a recording sheet is positioned upwards, and the flow charts in FIG. 12 shows that the first page is positioned at the top when the recording of a file is completed. Also the stapling unit 18 shown in FIG. 7A functions from above the stacked sheet, with the staple directed as shown in FIG. 7B. Thus the support portion 308 of the staple is brought in contact with the first page, so that said first page, which is most frequently turned over, is not easily detached. If the stapling device 307 of the stapling unit 18 is positioned below the sheet, it is possible to form a sheet path in such a manner that the image-bearing face of the sheet is positioned downwards, and to record the pages starting from the first page. The sheet path shown in FIG. 3A, in which the image on the sheet is positioned upwards, has an advantage of allowing visual confirmation of the image. The foregoing is applicable not only to the above-explained case of forming an image on a side of the sheet, but also to:

(1) mode of forming an image on each side of the sheet;

(2) mode of forming two images on a side of the sheet; and (3) mode of forming two images on each side of the sheet. In the above-mentioned modes (2) and (3), the sheet of first page means a face of sheet containing the image of the first page.

In the following there will be explained a mode of forming an image on each side of the recording sheet.

Said mode is selected by depressing the "one-image" switch 412 and the "two' side" switch 410 in the operation unit shown in FIG. 10. If post-processes are required, corresponding post-process switches are actuated. Then the recording is started by depressing the print switch 460. Now reference is made to FIGS. 18 and 3A for explaining the sheet movement in this mode.

Let us consider a case where a file is composed of 8 pages. The number of pages is entered at the storage of the image information into the electronic file unit 12, and is read at the recording operation. In case of recording on the top side of the sheet, a sheet fed from the small-size sheet cassette is subjected to the transfer of a visible image, then transported to the fixing unit 207 by the conveyor 206 and fixed. After image fixation, the sheet path is shifted toward the intermediate tray 214 by means of the guide members 208, 211 whereby the sheets are stacked on said intermediate tray 214 with the image bearing sides thereof positioned upwards.

In the recording on the top side, the exposure unit 201 records the even pages, in an order of page 2, page 4, page 6 and page 8. After recording on the top side, the sheet is refed by the feed roller 213 from the intermediate tray 214 for recording on the bottom side, then subjected to the transfer of an image from the photosensitive drum after inversion, further subjected to image fixation in the fixing unit 207, discharged from the recording apparatus through the guide member 208 and subjected to post-processes if necessary.

In the recording on the bottom side, the exposure unit 201 records the odd pages, in an order of page 7, page 5, page 3 and page 1 because the feed roller 213 feeds the sheets stacked on the intermediate tray 214 from the top. FIG. 18 shows the order of pages explained above.

It is also possible to at first record the image of page 8 on a sheet, then to store said sheet in the intermediate tray 214 in the inverted state, to refeed said sheet for recording the image of page 7 and to finally discharge said sheet. In this case the intermediate tray stores only one sheet, and the exposure unit 201 records the images in an order of page 8, 7, 6, 5, 4, 3, 2 and 1.

In the following there will be explained the two-side recording mode on a small size sheet, while making reference to the flow charts shown in FIG. 12.

When the step 13 identifies the two-side mode, MO is substituted in MA as in the one-side mode, then the variable N is increased by one, and there is discriminated whether the copying operations of a preset copy number have been completed (steps 51-53). Then there is discriminated whether the number MO of total page of the desired file is even (step 54), and, if even, the program jumps to a step 61. If even, MO is substituted in M indicating the print page, in order to print the last page (step 55), then a small size sheet is selected (step 56), and the image of page M is read and exposed with the laser beam onto the photosensitive drum (step 57). After recording, the sheet is discharged to the post-process units (unit 58). Then there is discriminated whether the number of total pages is one (step 59), and, if one, the program returns to the step 52 to repeat the recording operation by the preset copy number. If not one, the last even page number is substituted in the variable MA (step 60), then "2" is substituted in M for recording the first even page 2 (step 61), a small size sheet is selected (step 62), the image of page M is read and exposed (step 63), and the sheet after recording is stored in the intermediate tray (step 64). Then the variable M is increased by two in order to print even pages only in succession (step 65), then there is discriminated whether all the even pages have been recorded (step 66), and, if not, the program returns to the step 62 to repeat the above-mentioned procedure until the last even page is recorded. If all the even pages have been recorded, MA-1 is substituted in the variable M in order to record the last odd page (step 67), then the uppermost one of the sheets stacked on the intermediate tray and having even page images is fed (step 68), the image of page M is read and exposed (step 69), and the sheet after recording is discharged to the post-processing units (step 70). Then the variable M is decreased by two in order to successively print the off pages (step 71), then there is discriminated whether the recording has been completed to the page 1 (step 72), and, if not, the program returns to the step 68 to repeat the above-explained procedure until the page 1 is recorded. If completed there is discriminated the presence of a stapling command (step 73), then, there is discriminated whether the number of total pages is more than two (step 74), and, if more than two pages, a stapling operation is conducted (step 75). If there are two pages or less, the command is disregarded since the stapling is meaningless. Then there is discriminated whether a punching command has been given (step 76), and a punching operation is conducted if such command has been given (step 77). Then the program returns to the step 52 to repeat the above-explained procedure until the copies of the preset copy number are obtained.

In determining the image direction in the scanning exposure step 57, attention should be paid to the binding direction of sheets, and also to the matching with the stapling or punching unit if stapling or punching operation is applied.

Also the image position should be considered if a binding margin is to be formed. These factors are related with the binding direction and the binding margin of the originals. These factors will be explained in the following.

(1) Case of one-side originals without binding margin:
(A) When stapling or punching is required:

In this case it becomes necessary to control the position of the stapling or punching device and the image direction on both sides of the sheets in order to match the stapling or punching position with the binding direction. In FIGS. 19A and 19B, broken-lined areas indicate the original image areas, and, when the operator selects the binding at left, a movement of the image area by L1 provides an image with a binding margin as shown in FIG. 19C. The length L1 is predetermined, and an automatic displacement of the image area by L1 is achieved by controlling the timing of exposure with the laser beam or of start of sheet feeding by the registration rollers, when a binding margin is requested for one-side originals without binding margin. The amount of the binding margin can be regulated by the binding margin adjust switch 438.

The image direction can be controlled in the same manner as in the case that the stapling is requested for one-side originals without binding margin. For example, if the stapling position is fixed to the downstream side in the advancing direction of sheets and if left-bound copies are requested, the exposure operation on the photosensitive drum with the laser beam is conducted so as to obtain an erect image (see FIG. 14A). Also if the stapling position is variable, the image direction should be controlled according to the stapling position (see FIG. 14C). (B) When securing a binding margin only:

In this case the stapling or punching position need not be considered. Recording is made to obtain an erect image, in order to facilitate confirmation of image quality on the sheet or judgement whether the binding margin needs adjustment.

(2) Case of one-side originals with a binding margin:

In this case, the binding direction of the originals is same as or different from that designated for the copies.

At first there will be explained the case in which the binding direction of the originals is same as that designated for copies. FIG. 20A shows images A, B to be formed on the top and bottom sides of a sheet, and FIG. 20B indicates that a binding margin cannot be obtained with such images. For matching the binding margins on both sides of the sheets, the image B should be moved by L2−L1 (L2>L1) in a direction opposite to the binding direction of the originals, as shown in FIG. 20C.

In case the binding direction of the originals is different from that designated for the copies, the image A, to be formed on the top side of the sheet, should be moved by L2−L1 in a direction opposite to the binding direction of the originals.

The direction of the recorded image can be controlled in the same manner as in the mode for the one-side originals without binding margin. It can be controlled to match the stapling or punching position with the binding direction if a stapling or punching operation is required, and an erect image recording is employed in case merely securing a binding margin.

(3) Case of two-side originals without binding margin:

The positioning of the image can be determined in the same manner as in the mode of one-side originals without binding margin. Therefore the position and direction of the recorded image can be determined in the same manner, since the only difference is whether the images are obtained from a two-side original or from two one-side originals.

(4) Case of two-side originals with a binding margin:
(A) When the binding direction of the originals is same as that designated for the copies:

If a stapling or punching operation is requested, it becomes necessary to control the position of the stapling device 307 or the punching device 322 and the direction of images recorded on both sides of the sheet in order to match the stapling or punching position with the binding direction. FIG. 21A shows a left-bound original with images A, B on both sides, which are separately shown in FIG. 21B. FIG. 21C shows a desired copy, bound at left in the same manner as the original, and FIG. 21D shows corresponding images A and B. Comparison of FIGS. 21B and 21D indicates that the image positions on the original correspond to those on the desired copy, so that no image displacement is required for obtaining a binding margin. Same situation applies to the right-bound originals.

Also the direction of the recorded images needs only to be determined in consideration of the stapling or punching position, as already explained in the mode of one-side originals without binding margin.

If the stapling or punching is not required, an erect image recording is employed.

(B) When the binding direction of the originals is different from that designated for the copies:

Also in this case, if a stapling or punching operation is requested, the position of the stapling or punching device and the direction of images recorded on both sides of the sheet have to be controlled in order to matching the stapling or punching position with the binding direction. FIG. 22A shows a left-bound original with images A, B on both sides, which are separately shown in FIG. 22B. FIG. 22C shows a desired copy which is bound at right, different from the binding direction of the originals, and FIG. 22D shows the images A, B on said copy. Comparison on FIGS. 22B and 22D indicates that the relation of margins is inverted between the original and the copy. Therefore, for obtaining a desired binding margin, the images A and B on the sheet are moved by L2−L1 (L2>L1) in a direction opposite to the binding direction of the originals, through a timing control of the exposure with the laser beam or the sheet feeding with the registration rollers. The image direction on both sides of the sheet is determined in consideration of the position of the stapling or punching device, as already explained in the mode of one-side originals without binding margin, or an erect image recording is employed if the stapling or punching operation is not requested.

In the following there will be explained a mode of recording two images on a side of the sheet.

This mode employs a large size sheet. The control sequence in this mode will be explained with reference to FIG. 10 and FIGS. 23A–23I. At first a file number to be read is entered with the numeral keys 400, and the read-out key 406 is depressed to search the position of information of desired file number on the magnetooptical disk. Then conducted are: depression of the one-side switch 408 for selecting one-side recording; two-image key 414 for forming two images on a side; copy number setting; image density setting; depression of the binding margin switch 430 if a binding margin is required on the sheets; and actuation of post-process switches 450–454 if folding, stapling and/or punching is requested. If the folding switch 452 is actuated (step 91), there is indicated an automatic change to a mode of forming an image on each side of the sheet (step 92) by turning-off of the lamps in the one-side switch 408 and in the two-image switch 414 and turning-on of the lamps in the two-side switch 410 and the one-image switch 412. This is based on a fact that a copy obtained by forming two images on a side of a large size sheet (A3 or B4) and folding said sheet is as twice bulky as a copy obtained by forming an image on each side of a small size sheet (A4 or B5) for a same number of pages (see FIG. 24). Thus, if a folding operation is requested, the mode is automatically changed to the mode of forming an image on each side of a sheet in response to the depression of the print switch (step 93). However, if a folded copy with two images on a side is still desired, the one-side switch 408 or the two-image switch 414 is again actuated (step 93), whereby the lamps in the two-side switch 410 and the one-image switch 412 are turned off. The lamp of the folding switch 452 continues to be lighted. Steps 94, 95 discriminate whether the recording operations of preset copy number have been completed.

In the present mode of forming two images on a side of a sheet, it is to be remembered that a blank area may be formed on a sheet containing the image of last page, depending on whether the file to be recorded consists of odd or even pages. If the total number MO of the pages of the file is odd, a sheet bearing the image of the MO-th page should be half blank.

In a laser beam printer with reversal development, such blank is formed by not effecting the scanning exposure with the laser beam. A step 96 is provided in consideration of this fact, and steps 97 and 98 deal with the relation of the pages M1, M2 (M1>M2) of two images formed on a same sheet. If MO is odd, the blank area formed on the same sheet is represented as a (MO+1)-th page. Then a large size sheet (A3 or B4) is supplied from the sheet feeding unit (step 99).

In the following there will be explained the method of scanning exposure with the laser beam, in case of forming two images in a side of a large size sheet.

Prior to the exposure operation, images of two pages are read from the magnetooptical disk and temporarily stored in the page memory (DRAM) 28. Then the image information of a page is read from said page memory for effecting the exposure on the photo-sensitive drum 200 with the laser beam, and the exposure with the image information of the remaining page is conducted thereafter.

FIG. 26 illustrates a case of a file of 8 pages, wherein a first sheet records pages 7 and 8, a second sheet records pages 5 and 6, a third sheet records pages 3 and 4, and a fourth sheet records pages 1 and 2.

The lateral arrangement of two images is determined by the control unit 26 according to the binding direction, which is designated by the switch 432. For example, if the stapling or punching device is at the downstream position with respect to the advancing direction of the sheets and if left-bound copies are desired, an erect image of page M1 is placed at left, and an erect image of page M2 is placed at right (M2>M1). In this case, the scanning exposure of the pages M1, M2 with the laser beam is started from a direction A shown in FIG. 5A. If right-bound copies are desired, an erect image of page M1 is placed at right and an erect image of page M2 is placed at left (M2>M1), thereby matching the stapling or punching position with the designated binding direction. Naturally said erect images may be inverted to place the page M1 at right and M2 at left for obtaining a left-bound copy, in which case the scanning exposure is conducted in the direction B shown in FIG. 5A. The foregoing sequence is handled by steps 109 to 114.

As already explained, the lateral arrangement of the pages M1 and M2 can be switched by the binding direction switch 432. After said exposure, there are conducted steps of image development and fixation, and the sheet is discharged to the post-processing units (step 101-1).

In the mode of recording two images on a side or on each side of the sheet, it is to be noted that an instruction for changing the lateral arrangement of two images is disregarded once the laser scanning exposure for the first page is started. In the present embodiment, such instruction is given by the binding direction switch 432. For example, if left-hand binding is designated at first, then right-hand binding is selected after the recording of first sheet, then left-hand binding is selected after the recording of second sheet, and right-hand binding is selected after the recording of third sheet, the obtained copies will be inconvenient for reading when bound, since, as shown in FIG. 25, the first sheet has pages 1 and 2 respectively at left and right, then the second sheet has pages 3 and 4 respectively at right and left, the third sheet has pages 5 and 6 respectively at left and right, and the fourth sheet has pages 7 and 8 respectively at right and left. It is therefore necessary to maintain the binding direction, after the recording of the first sheet, at least until the completion of recording of all pages in the file, disregarding eventual instruction during this period. This is achieved by prohibiting the entry of a command for changing the binding direction into the control unit 26 after the completion of recording of the first sheet. The recording is considered complete if a sheet is discharged from the apparatus without jamming between the sheet feed unit and the discharge unit. In certain apparatus, however, next recording operations such as charging, exposure, image development etc. may be started and a next sheet may be fed before the confirmation of the discharge of the first sheet without jamming. Such recording operation for the second sheet is conducted on the assumption that the first sheet is not jammed, so that the present invention is evidently applicable also in such case. The above-mentioned objective is achieved, more practically, by prohibiting the entry of a command for changing the binding direction after the completion of exposure for the first sheet, or after the start of exposure of an image for the first sheet. In such case, when said command is given before the feeding of the first sheet from the registration rollers, said sheet feeding is temporarily suspended. Subsequently an exposure is conducted with a modified binding direction, and the sheet is fed from the registration rollers at such timing that the front end of the image coincides with that of the sheet. The above-explained control for changing the lateral image arrangement in response to a command for changing the binding direction is applicable also in the mode of recording two images on each side of the sheet, which will be explained in the following.

Steps 101-2 and 101-3 perform sheet folding in response to a corresponding command.

A step 102 decreases M1, M2 by two, in order to determine the pages of two images to be formed on the next sheet. A step 103 discriminates whether M2 is smaller than 1, i.e. whether the recording of the desired file has been completed. The program retuns to the step 99 if the recording is to be continued, or proceeds to post-process steps if the recording is completed.

Steps 104–108 perform stapling or folding in response to respective instructions. If the file has two pages or less, the stapling command is disregarded (step 105) since there is only one sheet and stapling is useless.

Reference is made to FIG. 26, showing a case of a file of 8 pages, for explaining the steps of the above-explained recording operation. Four large size (A3) sheets are supplied from the sheet feed unit 202-204. The first sheet records pages 7 and 8, second records pages 5 and 6, third records pages 3 and 4, and fourth records pages 1 and 2, and the first sheet is discharged to the post-process units at first.

The recording in such order with images on top side places the sheet containing the first page at the uppermost position, thereby allowing to immediately observe the images, and, in a stapling operation from above, bringing the support portion of the staple in contact with the uppermost sheet which contains the image of the first page and which is most often turned over, thus providing a greater protection to the sheets.

In the following there will explained a mode of forming two images on each side of the sheet, while making reference to FIG. 10. At first a file number to be read is entered by the numeral keys 400, and the reading key 406 is depressed to search the position of the information corresponding to said file number on the magnetooptical disk. Then actuated are the two-side switch 410 for selecting two-side recording, and the two-image key 414 for placing two images on each side.

In this manner selected is the two-side recording explained, still contains two modes: (1) a first mode in which the pages are in correct order when the sheets are bound at right or left and turned over, and (2) a second mode in which the pages are in correct order when the sheets are bound at the center and turned over. Said first or second mode can be selected by a switch 416 or 418, positioned under the two-image switch 414.

Then designated is the single sheet size mode or the mixed sheet size mode. Without designation, the former is automatically adopted. Subsequently there are conducted the setting of copy number; setting of image density; actuation of the binding margin switch 430 if a binding margin is requested on the sheets; and the actuation of post-process switches if folding, stapling and/or punching is requested.

Now reference is made to FIGS. 23A to 23I for explaining the recording operation in this mode. Steps 115 and 116 discriminate the completion of setting of copy number, then a step 117 discriminates the operating mode, and the program proceeds to a step 119 or 118 respectively in the first or second mode. The step 119 discriminates the sheet size mode, and the program proceeds to a step 122 or 123 respectively in the single sheet size mode or in the mixed sheet size mode.

(A) First mode:

(1) Single sheet size mode:

The step 122 effects recording operation in the single sheet size mode, as will be explained in the following with reference to FIGS. 27A to 27D. In this mode the sheet feeding and recording operation are so controlled as to use only a large sheet size, and the sheet transportation and the scanning exposure in the recording apparatus are varied according to the total number of pages of the file to be recorded. In the following there will be explained a case of left-bound copies. In each of FIGS. 27A to 27D, the left-hand half illustrates the arrangement of pages on the recorded sheets, and the right-hand half illustrates the sheets discharged, sheets stacked on the intermediate tray and sheet movements. In the discharged state, the lowermost one is discharged first. On the intermediate tray, the sheets are stacked from the lowermost one and fed from the uppermost one. Figures attached to each sheet indicate pages. Mode of illustration is same as in FIGS. 28, 29 and 30.

Let us consider a case of three sheets. Since each sheet can accommodate four images on two sides, the total number of pages in a file can be represented by $MO=4K$, $MO=4K+1$, $MO=4K+2$ or $MO=4K+3$ ($K=0, 1, 2, \ldots$).

At first there will be explained a case $MO=4K$ wherein $K=3$, i.e. total 12 pages. At first a first sheet records pages 3 and 4 and is placed on the intermediate tray. Then a second sheet records pages 7 and 8 and is stacked on the first sheet on the intermediate tray. A third sheet then records pages 11 and 12 and is placed on said second sheet. Then the third sheet is fed from the intermediate tray 214 and records pages 9 and 10 on the top side. Then the second sheet is similarly fed from the intermediate tray 214 and records pages 5 and 6 on the top side, and the first sheet is fed and records pages 1 and 2.

When the total number of pages is represented by $MO=4K+1$, the last page is singly recorded on a sheet. In case of $K=2$ or total 9 pages, a first sheet records the last page 9 and is discharge from the recording apparatus. The remaining pages are recorded by an operation corresponding to a case of $MO=4K$, $K=2$. When the total number of pages is represented by $MO=4K+2$, the last page and an immediately preceding page are recorded on a sheet. For example, in case of $K=2$ or total 10 pages, a first sheet records pages 9 and 10 and is discharged from the apparatus. The remaining pages are recorded by an operation corresponding to a case of $MO=4K$, $K=2$. When the total number of pages is represented by $MO=4K+3$, a sheet recording the last page MO also records pages MO-1 and MO-2 on the other side. The remaining pages are recorded by an operation correspoding to a case of $MO=4K$. In case of $K=2$, or total 11 pages, a first sheet at first records pages 3 and 4 and is placed on the intermediate tray. Then a second records pages 7 and 8 and is stacked on the first sheet on the intermediate tray. A third sheet records page 11 only and is placed on said second sheet. Then the third sheet is fed from the intermediate tray and records pages 9 and 10 on the opposite side. Subsequently the second and first sheets are fed from the intermediate tray to record pages 5 and 6, and pages 1 and 2, respectively, on the opposite side.

The above-explained recording operation is controlled by a flow chart shown in FIG. 23G.

Figure 33:
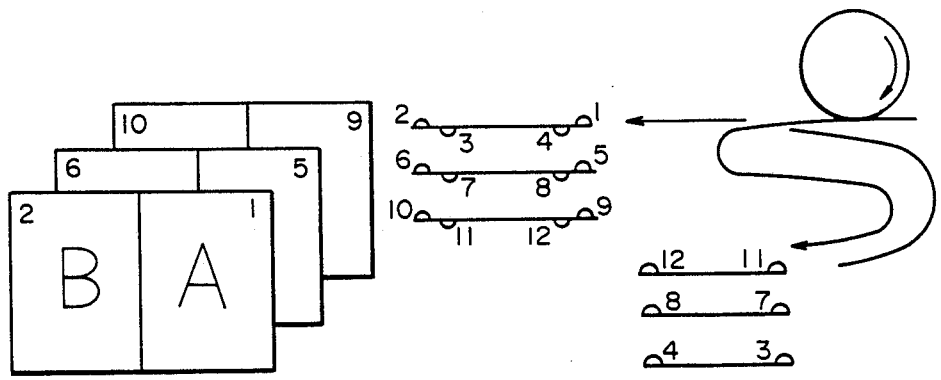
FIG. 33 is a view showing the order of pages of recorded images in a first mode for stapling at the right end.

FIG. 33 shows a case of right-bound copies with 12 pages in total. It will be understood that the arrangement of pages on each sheet is inverted, in comparison with the left-bound case. The designated binding direction can be matched with the stapling or punching position, (1) in case of left-end binding by placing the stapling or punching device at the downstream side or upstream side in the advancing direction of sheets respectively in case of an erect image or an inverted image, or (2) in case of right-end binding, by placing the stapling or punching device at the upstream side or downstream side in said advancing direction respectively in case of an erect image or an inverted image. This will be easily understood from FIG. 14. (2) Mixed sheet size mode:

The step 123 effects recording operation in the mixed sheet side mode, as will be explained in the following with reference to FIGS. 28A to 28B. In this mode the size of the recording sheet is selected according to the total number of pages in a file, thereby eliminating or reducing blank area in the obtained copies. This mode is conducted only when said total number of pages is represented by MO=4K or MO=4K+2 (K=0, 1, 2, . . .). If said number is represented by MO=4K or MO=4K+3, the sheet transportation and the exposure are conducted in the same manner as in the single sheet size mode. In the present mode wherein the total number of pages is represented by MO=4K+1 or MO=4K+2, a small size sheet (A4 or B5) is utilized.

In case of MO=4K+1, the last page alone is recorded on a side of said small size sheet, and, in case of MO=4K+2, the last page and the preceding page are recorded on both sides of said small size sheet. Now let us consider a case of MO=4K+1, K=2, while making reference to FIG. 28A. At first, a small size sheet is fed as the first sheet from the sheet feed unit 202-204, records page 9 and is discharged from the apparatus.

Then large size sheets are fed as second and third sheets, and the sheet movement and recording operation are conducted in the same manner as in the case of MO=4K, K=2. In case of MO=4K+2, let us consider an example K=2. At first a large size sheet is fed from the sheet feed unit 202-204 as the first sheet, records pages 3 and 4, and is placed on the intermediate tray 214. Then a second large size sheet is fed, records pages 7 and 8 and is stacked on the first sheet on the intermediate tray 214. Then a third small size sheet is fed, records page 10 and is placed on the second sheet. Then said third sheet is fed from the intermediate tray 214, records page 9 on the opposite side and is discharged from the apparatus. The second large size sheet is then fed from the intermediate tray 214, records pages 5 and 6 on the opposite side, and is discharged. Finally the first sheet records pages 1 and 2 and is discharged.

Figure 23A:
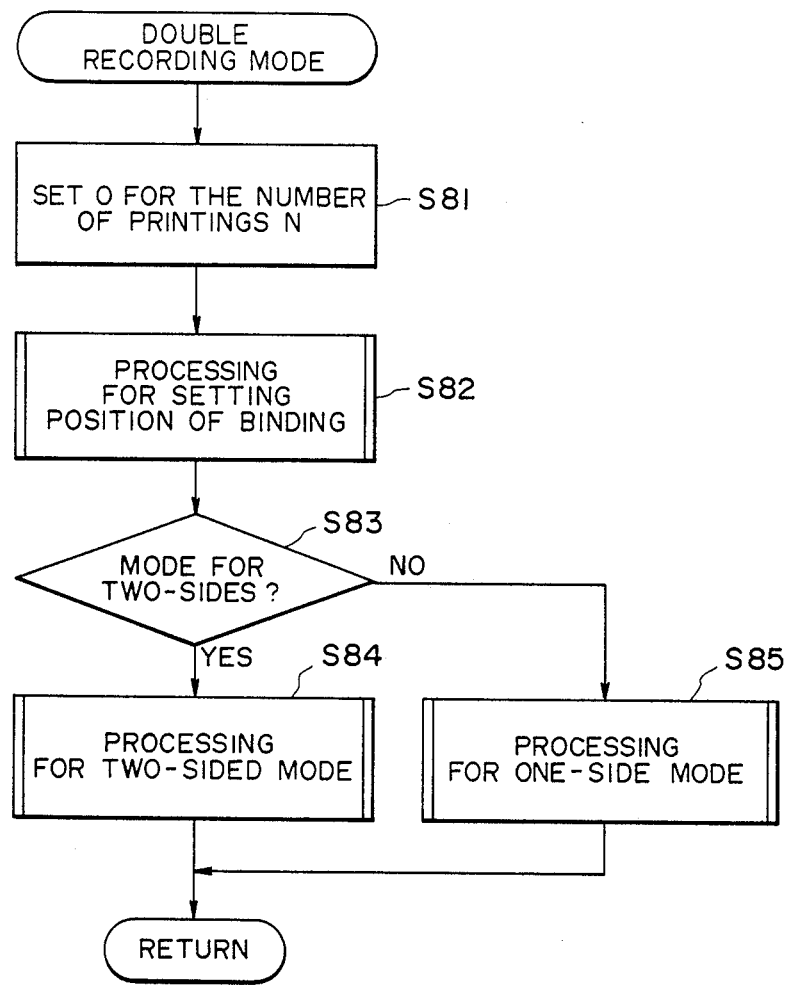
Figure 23B:
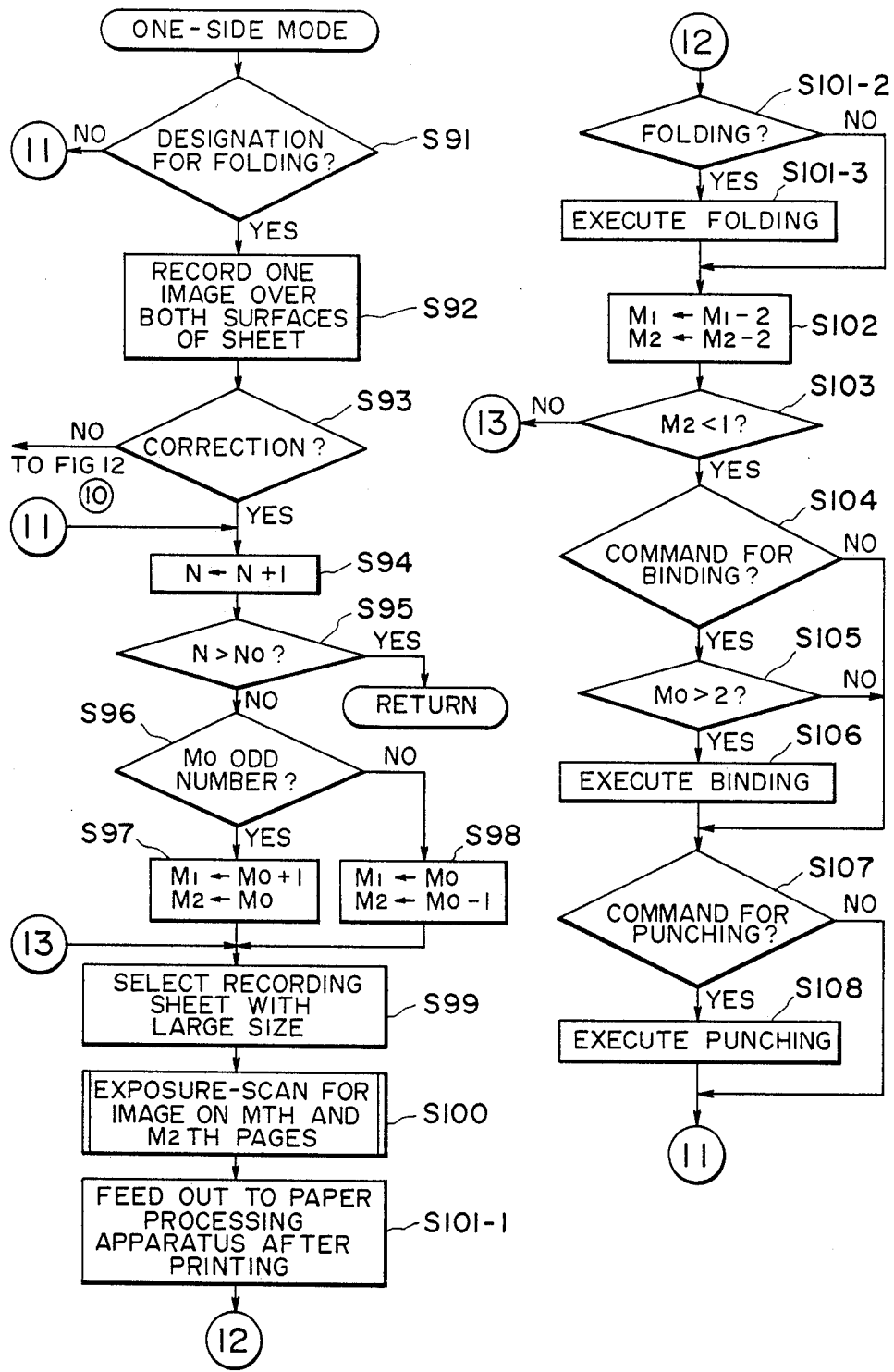
Figure 23C:
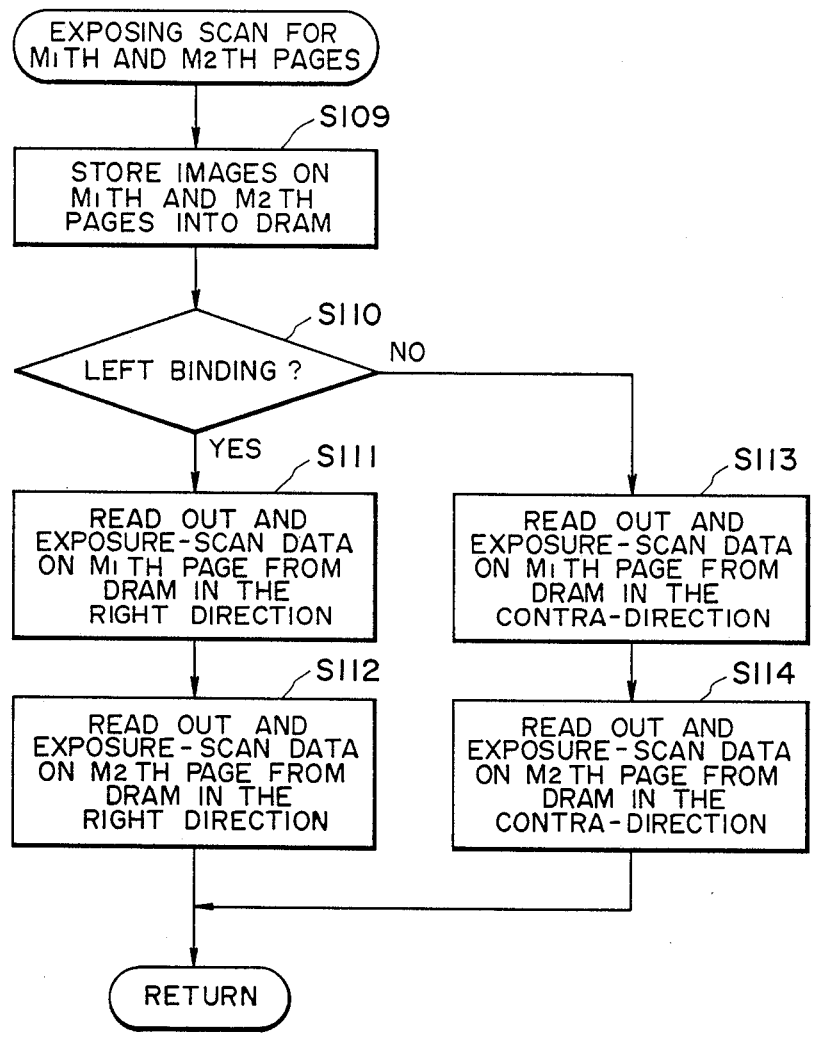
Figure 23D:
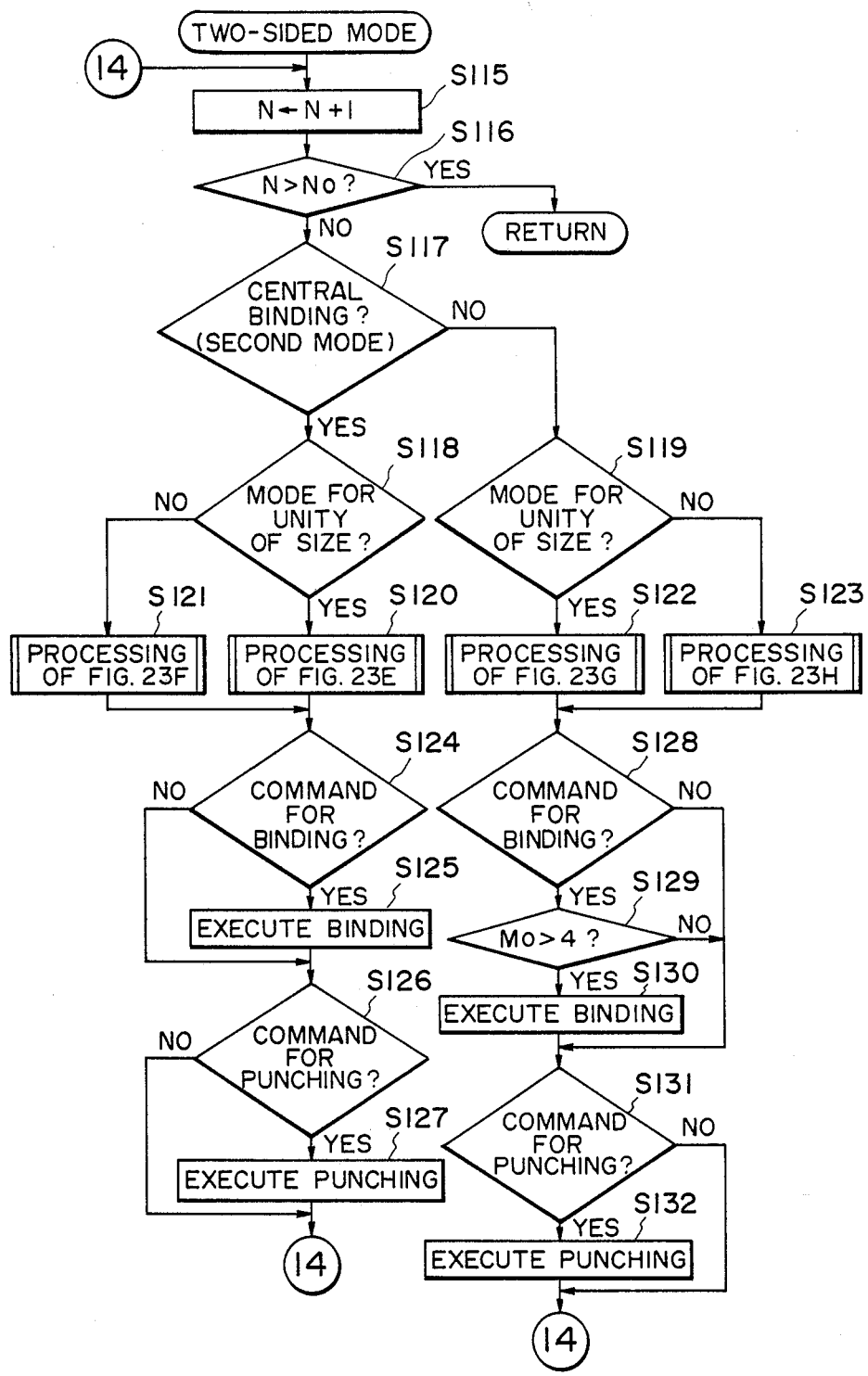
Figure 23H:
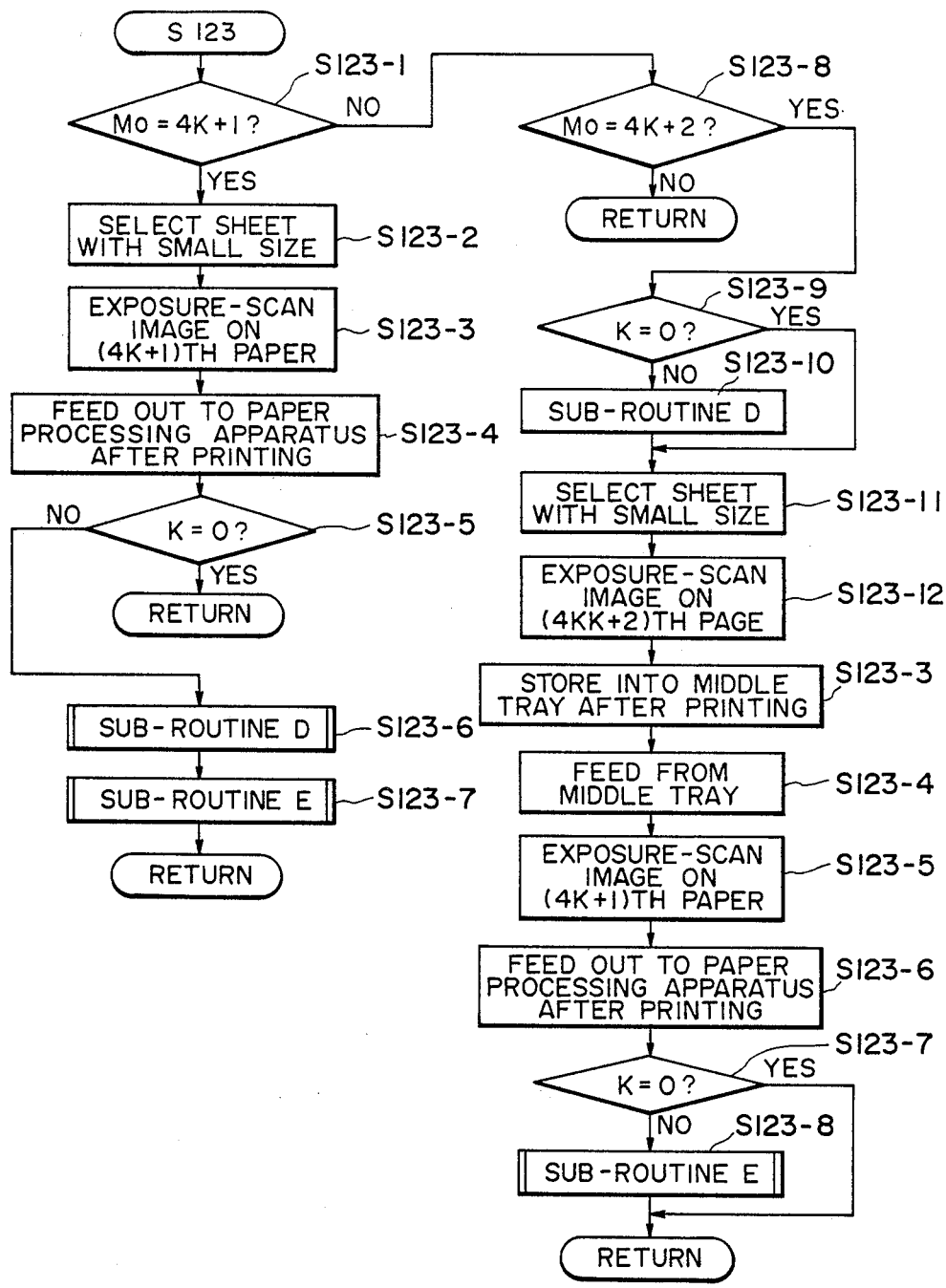
Figure 231:
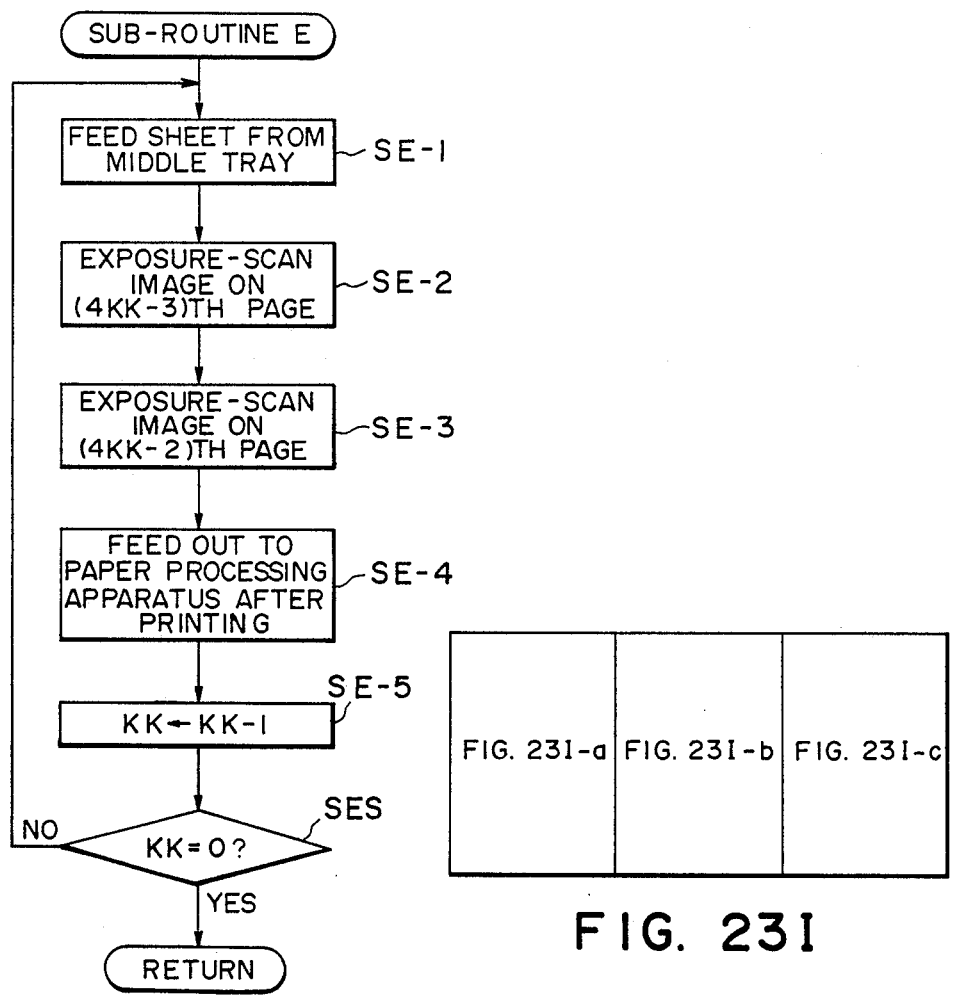

FIG. 23H is a flow chart showing the above-explained recording operation. The sheet recorded in the single sheet size mode or in the mixed sheet size mode in the step 122 or 123 is subjected to stapling and/or punching in steps 128-132 if such post processes are instructed. Thereafter the program returns to the step 115 to repeat the recording operation if necessary. The relation between the binding direction and the stapling or punching position is same as in the single sheet size mode. (B) Second mode:

When the stpe 117 identifies the second mode, a step 118 discriminates the sheet size mode, and the program proceeds to a step 120 or 121 respectively in the single sheet size mode or in the mixed sheet size mode. (1) Single sheet size mode:

The step 120 effects the recording operation in the single sheet size mode, as will be explained in the following with reference to FIGS. 29A to 29D. Also in this mode, the sheet transportation and the exposure are conducted differently according to the total number of pages in the desired file. At first there will be explained a case of MO=4K (K=0, 1, 2, . . .), taking an example of K=3. At first a first sheet records pages 2 and 11, and is placed on the intermediate tray. Then a second sheet records pages 4 and 9, and is stacked on the first sheet on the intermediate tray. A third sheet then records pages 6 and 7 is placed on said second sheet. Then said third sheet is fed from the intermediate tray, records pages 8 and 5 on the opposite side, and is discharged from the apparatus. Similarly the second sheet records pages 10 and 3 on the opposite side, and the first sheet records pages 12 and 1 on the opposite side.

Now there will be explained a case of MO=4K+1 (K=0, 1, 2, . . .), taking a example of K=2. A first records page 2 only, the other page remaining as bland, and is placed on the intermediate tray. A third sheet records pages 6 and 7, and is placed on the second sheet on the intermediate tray 214. Then said third sheet is fed from the intermediate tray 214, records pages 8 and 5 on the opposite side and is discharged from the apparatus. Then the second sheet is fed from the intermediate tray 214, records page 3 at a position opposite to the page 4 but leaves the other page as blank, and is discharged. Similarly the first sheet is fed from the intermediate tray, records page 1 at a position opposite to the page 2 but leaves the other page as blank, and is discharged.

The operation in case of MO=4K+2 is conducted in the following manner. The first, second and third sheets record, on the bottom side, same pages in same order as in the case of MO=4K+1. Also when refed from the intermediate tray, the third and first sheets record, on the opposite side, same pages in same order as in the case of MO=4K+1. Only difference lies in that the second sheet records pages 10 and 3 on the opposite side after supplied from the intermediate tray.

Finally there is explained a case of MO=4K+3. The first, second and third sheets record same pages in same order as in the case of MO=4K. Also the third and second sheets refed from the intermediate tray record same pages in same order as in the case of MO=4K+2. Only difference lies in that the first sheet fed from the intermediate tray records page 1 in a position corresponding to the page 2 and leaves the other page as blank. In this single sheet size mode the sheets are folded in a direction as shown in FIG. 8, so that the pages are in correct order when sheets are turned over in such folded state. (2) Mixed sheet size mode:

The step 121 effects the recording operation in the mixed sheet size mode, as will be explained in the following with reference to FIGS. 30A to 30D. Also in this mode the sheet transportation and the exposure are dependent on the total number of pages in the desired file. In the following there will be explained an example of left-bound copies.

In said mixed size mode, the sheet transportation and the exposure are conducted in the same manner as in the single sheet size mode if the total number of pages is represented by MO=4K or MO=4K+3.

In case of MO=4K+1, a small size sheet is fed as the first sheet, records page 9, is discharged from the apparatus and passes the folding unit without folding operation regardless whether the folding is instructed. Then large size sheets are fed as the second and third sheets, record pages 2, 7 and pages 4, 5 respectively and stacked on the intermediate tray, the second sheet being placed lower. Then said third sheet is fed from the intermediate tray, records pages 6 and 3 on the opposite side and is discharged from the apparatus. Finally the second sheet is fed from the intermediate tray, records pages 8 and 1 on the opposite side and is discharged.

The case of MO=4K+2 is different from the case of MO=4K+1 in that the small size sheet has to be stored in and fed from the intermediate tray in order to form images on both sides.

In this case, a first large-size sheet is fed, records pages 2 and 7, and is placed on the intermediate tray. Then a second large size sheet is fed, records pages 4 and 5, and is stacked on the first sheet on the intermediate tray. A third small-size (A4) sheet records page 10, and is placed on the second sheet on the intermediate tray.

The said third sheet is fed from the intermediate tray, records page 9 on the opposite side, is discharged and is not folded regardless whether the folding operation is instructed. Then the second sheet is fed from the intermediate tray, records pages 6 and 3 on the opposite side and is discharged. Finally the first sheet records pages 8 and 1 on the opposite side. The first and second large-size sheets are folded, in necessary, in the center and in a direciton shown in FIG. 8, so that the pages are in correct order when the sheets are turned over in thus bound state. Then steps 124–127 effect stapling and/or punching if such post processes are instructed. Then the program returns to the step 115 to repeat the recording operation if necessary. However, if the stapling is requested in this second mode, the order of exposure operations may have to be changed if the total number of pages exceeds the binding ability of the stapling unit. The operation in such case will be explained in the following, with reference to FIGS. 31A to 31D, wherein the binding ability of the stapling unit is assumed as 4 sheets for the simplicity of explanation.

Figure 31B:
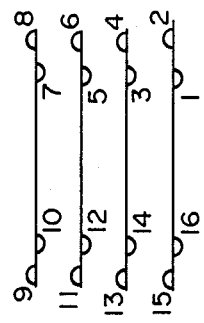
FIGS. 31A to 31D are views showing the order of pages of recorded images in different stapling capabilities.
Figure 31D:
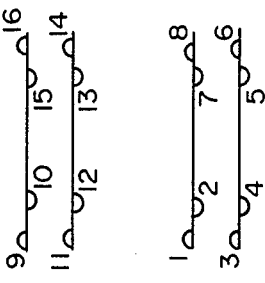
Figure 31A:
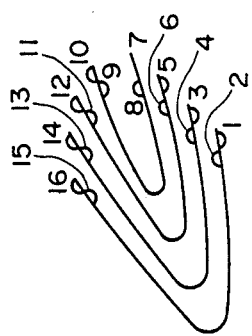
Figure 31C:
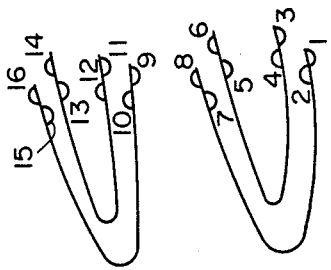

More specifically, let us consider a case of copies of 16 pages in total. FIG. 31A shows the relation between sheets and pages in case the stapling unit has a sufficient high ability, capable of stapling 16 pages at a time. FIG. 31B shows the same sheets in extended form, in order to clarify the pages and order thereof on each sheet. On the other hand, FIG. 31C shows the relation between sheets and pages in case the stapling unit can bind only four sheets at maximum so that the sheets containing 16 pages have to be divided into two portions. FIG. 31D shows the same sheets in extended form. As will be apparent from the comparison of FIGS. 31B and 31D, the pages to be formed on a sheet and the order thereof are different in these two cases. Therefore the scanning exposure operation with the laser beam has to be controlled according to the stapling ability and the total number of pages.

In the following there is explained the specific control on the order of pages. It is assumed that the file has a total number MO of pages, and the stapling unit can bind KN sheets. When the sheets are folded in the center and stapled at a position slightly distant from said center, each staple penetrates each sheet twice. Consequently a stapling unit of an ability of KN sheets can staple N2 large sheets which are equal to the integral part of KN/2. On the other hand, the number NN of sheets required for recording all the pages MO is represented by the integral portion of (MO+3)/4. Thus, the number KK of staplings required for stapling all the sheets recording all the pages is represented by the integral portion of NN/N2+1.

Thus, in order to divide the images of all the pages exceeding the binding ability of the stapling unit into one or plural sheet bundles, and to obtain, on the discharge tray, a sheet bundle containing the first page at the top, and another bundle containing the last page MO at the bottom, the stapling operations should be conducted in the following manner:

| | |
|---|---|
| 1st stapling: | from page (KK − 1) × 4 × N2 + 1 to page M0; |
| 2nd stapling: | from page (KK − 2) × 4 × 2N + 1 |
| (KK − 1)-th stapling: | to page (KK − 1) × 4 × 2N from page 1 × 4 × N2 + 1 to page 2 × 4 × N2 |
| KK-th stapling: | from page 1 to page 1 × 4 × N2 |

Figure 32:
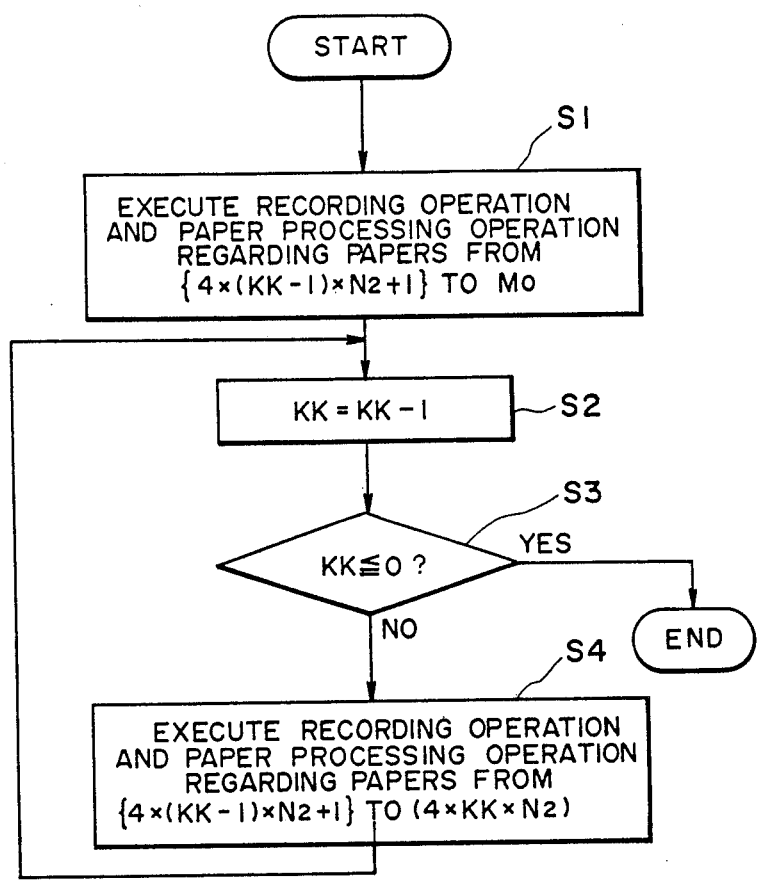
FIG. 32 is a flow chart showing the function for dividing the recorded images into plural bundles.

FIG. 32 shows a flow chart corresponding to such stapling operation, wherein a step 1 performs recording and stapling of the pages for the first stapling, from page (KK−1)×4×N2 +1 to page MO.

The detailed sheet movement and order of pages will be explained since they are already explained.

A step 2 decreases the value of KK by one for controlling the remaining number of stapling operation, and a step 3 terminates the operation if the value of KK is equal to or less than zero. If the value of KK is larger than zero, the program proceeds to step 4 for effecting the recording and stapling for the pages from 4×(KK−1)×N2+1 to 4×NN×N2 and the program then returns to the step 2.

The present invention is not limited to the foregoing embodiments but is subjected to various modifications within the scope and spirit of the appended claims

We claim:

1. An image forming apparatus comprising:
   means for generating plural image information;
   means for forming, on a sheet, an image based on the image information generated by said image information generating means; wherein said image forming means has a mode of forming plural images on a side of said sheet;
   means for applying a post process to the sheet bearing thus formed image; and
   control means for varying, when said mode is adopted, the positions of plural images to be formed on said sheet according to the position of said post process on the sheet.

2. An image forming apparatus according to claim 1, wherein said post process means is adapted to a staple said sheet.

3. An image forming apparatus according to claim 1, wherein said post process means is adapted to punch said sheet.

4. An image forming apparatus according to claim 1, wherein said control means is further adapted to change the direction of the image to be formed on said sheet.

5. An image forming apparatus according to claim 4, further comprising a memory for temporarily storing the image information generated by said image information generating means, wherein said image forming means is adapted to effect image formation according to the image information read from said memory, and said control means is adapted to control the read-out position of the image information of a page from said memory.

6. An image forming apparatus according to claim 5, wherein said control means is further adapted to control the reading direction of the image information of a page from said memory.

7. An image forming apparatus according to claim 1, wherein said image information generating means comprises a memory medium capable of storing plural images.

* * * * *

UNITED STATES PATENT AND TRADEMARK OFFICE
CERTIFICATE OF CORRECTION

PATENT NO. : 4,763,167
DATED : August 9, 1988
INVENTOR(S) : TSUTOMU WATANABE, ET AL.

It is certified that error appears in the above-identified patent and that said Letters Patent is hereby corrected as shown below:

On the Title Page, Item [22] Filed:

"Mar. 13, 1987" should read --Mar. 10, 1987--.

IN THE DRAWINGS

Sheet 12, Figure 12C, "RAGES" should read --PAGES--.
Sheet 12, Figure 12C, "SIEZ" should read --SIZE--.
Sheet 13, Figure 12D-a, "RAGES" should read --PAGES--.
Sheet 27, Figure 23E-a, "MIDDEL" should read --MIDDLE--.
Sheet 28, Figure 23E-b, "MIDDEL" should read --MIDDLE--.
Sheet 29, Figure 23E-c, "MIDDEL" should read --MIDDLE--.
Sheet 30, Figure 23F-a, "MIDDEL" should read --MIDDLE--.
Sheet 23, Figure 23B, "MTH" should read --$M_1$ TH--.

COLUMN 1

Line 9, "is" should read --has been--.
Line 25, "is" (second occurrence) should read --are--.
Line 50, "forming for example" should read --forming, for example,--.

COLUMN 2

Line 52, "and a recording unit" should read --and a reading unit--.
Line 60, "and are" should read --and 7B are--.

UNITED STATES PATENT AND TRADEMARK OFFICE
CERTIFICATE OF CORRECTION

PATENT NO. : 4,763,167

DATED : August 9, 1988

INVENTOR(S) : TSUTOMU WATANABE, ET AL.

It is certified that error appears in the above-identified patent and that said Letters Patent is hereby corrected as shown below:

COLUMN 3

Line 18, "or" should read --of--.

COLUMN 4

Line 52, "magneto optical" should read --magnetooptical--.

COLUMN 5

Line 26, "range" should read --range of--.

COLUMN 6

Line 18, "original" should read --originals--.
Line 19, "original" should read --originals--.
Line 55, "recroding" should read --recording--.
Lines 67-68, "feeder. [3. Recording unit]" should read --feeder. ¶ [3. Recording unit]--.

COLUMN 7

Line 23, "can" should read --cam--.

COLUMN 8

Line 28, "beam. [4." should read --beam. ¶ [4.--.

UNITED STATES PATENT AND TRADEMARK OFFICE
CERTIFICATE OF CORRECTION

PATENT NO. : 4,763,167
DATED : August 9, 1988
INVENTOR(S) : TSUTOMU WATANABE, ET AL.

It is certified that error appears in the above-identified patent and that said Letters Patent is hereby corrected as shown below:

COLUMN 9

Line 25, "abount" should read --about--.
Line 40, "porceeds" should read --proceeds--.
Line 47, "and" should read --to--.
Line 68, "After released" should read --After being released--.

COLUMN 10

Line 49, "to" should read --to be--.
Line 57, "actuation" should read --actuating--.

COLUMN 11

Line 29, "on a" should read --on one--.
Line 31, "mixed" should read --mix--.

COLUMN 12

Line 28, "right-bound" should read --right binding--.

COLUMN 13

Line 39, "damages" should read --damaged--.
Line 46, "a" should read --at--.

COLUMN 15

Line 58, "botoom" should read --bottom--.

UNITED STATES PATENT AND TRADEMARK OFFICE
CERTIFICATE OF CORRECTION

PATENT NO. : 4,763,167

DATED : August 9, 1988

INVENTOR(S) : TSUTOMU WATANABE, ET AL.

It is certified that error appears in the above-identified patent and that said Letters Patent is hereby corrected as shown below:

COLUMN 19

Line 21, "(see FIG. 14C). (B) When" should read --(see FIG. 14C). ¶ (B) When--.
Line 25, "image," should read --image--.

COLUMN 20

Line 24, "matching" should read --match--.
Line 30, "on FIGS." should read --of FIGS.--.
Line 45, "on a" should read --on one--.
Line 67, "as twice" should read --twice as--.

COLUMN 22

Line 60, "retuns" should read --returns--.

COLUMN 23

Lines 24-25, "recording explained," should read --recording mode with two images on each side, which, as already explained,--.

COLUMN 24

Line 23, "discharge" should read --discharged--.
Line 62, "FIG. 14. (2) Mixed" should read --FIG. 14. ¶ (2) Mixed--.

UNITED STATES PATENT AND TRADEMARK OFFICE
CERTIFICATE OF CORRECTION

PATENT NO. : 4,763,167
DATED : August 9, 1988
INVENTOR(S) : TSUTOMU WATANABE, ET AL.

It is certified that error appears in the above-identified patent and that said Letters Patent is hereby corrected as shown below:

COLUMN 25

Line 44, "mode. (B) Second" should read
--mode. ¶ (B) Second--.
Line 45, "stpe" should read --step--.
Lines 48-49, "mode. (1) Single" should read
--mode. ¶ (1) Single--.
Line 68, "a example" should read --an example--.
Line 68, "A first" should read --At first a first sheet--.

COLUMN 26

Line 1, "bland," should read --blank,--.
Line 2, After "." insert --The second sheet is recorded and is placed in the intermediate tray.
Line 33, "state. (2) Mixed" should read
--state. ¶ (2) Mixed--.

COLUMN 27

Line 8, "in necessary," should read --if necessary,--.
Line 9, "direciton" should read --direction--.
Line 41, "on the" should read --of the--.

UNITED STATES PATENT AND TRADEMARK OFFICE
CERTIFICATE OF CORRECTION

PATENT NO. : 4,763,167

DATED : August 9, 1988

INVENTOR(S) : TSUTOMU WATANABE, ET AL.

It is certified that error appears in the above-identified patent and that said Letters Patent is hereby corrected as shown below:

COLUMN 28

Line 12, "will" should read --will not again--.
Line 23, "subjected" should read --subject--.
Line 24, "claims" should read --claims.--.

Signed and Sealed this

Sixteenth Day of May, 1989

Attest:

DONALD J. QUIGG

Attesting Officer

Commissioner of Patents and Trademarks